US010901861B2

(12) United States Patent
Martin et al.

(10) Patent No.: US 10,901,861 B2
(45) Date of Patent: *Jan. 26, 2021

(54) SYSTEMS AND METHODS OF RESTORING A DATASET OF A DATABASE FOR A POINT IN TIME

(71) Applicant: salesforce.com, inc., San Francisco, CA (US)

(72) Inventors: Jameison Bear Martin, Oakland, CA (US); Nathaniel Wyatt, San Francisco, CA (US); Patrick James Helland, San Francisco, CA (US); Thomas Fanghaenel, Oakland, CA (US); Terry Chong, Pleasanton, CA (US); Subho Sanjay Chatterjee, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/774,244

(22) Filed: Jan. 28, 2020

(65) Prior Publication Data

US 2020/0159628 A1 May 21, 2020

Related U.S. Application Data

(63) Continuation of application No. 15/634,796, filed on Jun. 27, 2017, now Pat. No. 10,592,353.

(51) Int. Cl.
*G06F 11/00* (2006.01)
*G06F 11/14* (2006.01)
*G06F 16/21* (2019.01)

(52) U.S. Cl.
CPC ...... *G06F 11/1469* (2013.01); *G06F 11/1451* (2013.01); *G06F 11/1471* (2013.01);
(Continued)

(58) Field of Classification Search
CPC ............. G06F 11/1435; G06F 11/1446; G06F 11/1469; G06F 11/1471; G06F 11/1474
See application file for complete search history.

(56) References Cited

U.S. PATENT DOCUMENTS 8,037,345 B1 10/2011 Iyer
8,977,898 B1 3/2015 Veeraswamy
(Continued)

OTHER PUBLICATIONS

PCT International Search Report and Written Opinion for PCT/US2018/39457, dated Oct. 15, 2018, 13 pages.
(Continued)

*Primary Examiner* — Elmira Mehrmanesh
(74) *Attorney, Agent, or Firm* — Butzel Long

(57) ABSTRACT

Systems and methods are provided for performing a point-in-time restore of data of a first tenant of a multitenanted database system. Metadata can be located to identify an archival version of first data of the first tenant stored in immutable storage of the database system. The archival version includes a most recently committed version of each datum prior to a first point in time. By using the metadata, a restore reference set is mapped into a target database instance of the database system. The mapping can be performed when all existing data for a tenant is to be the archival version, and where versions of data and records committed after the point in time are not available to the target database instance.

7 Claims, 17 Drawing Sheets

(52) U.S. Cl.
CPC ........ *G06F 11/1474* (2013.01); *G06F 16/219* (2019.01); *G06F 2201/80* (2013.01); *G06F 2201/805* (2013.01); *G06F 2201/82* (2013.01); *G06F 2201/84* (2013.01)

(56) References Cited

U.S. PATENT DOCUMENTS

| | | |
|---|---|---|
| 9,372,743 B1 | 6/2016 | Sethi |
| 9,552,242 B1 | 1/2017 | Leshinsky |
| 9,684,570 B1 | 6/2017 | Wilding |
| 9,727,598 B2 | 8/2017 | Wilding |
| 10,108,497 B1 | 10/2018 | Chockalingam |
| 10,193,977 B2 | 1/2019 | Ke |
| 10,592,353 B2 * | 3/2020 | Martin ................ G06F 11/1474 |
| 2014/0195492 A1 | 7/2014 | Wilding |
| 2014/0325170 A1 | 10/2014 | Aswathanarayana |
| 2015/0178167 A1 | 6/2015 | Kulkarni |
| 2016/0092319 A1 | 3/2016 | Parkinson |
| 2016/0117228 A1 | 4/2016 | Farlee |
| 2016/0117318 A1 | 4/2016 | Helland |
| 2017/0075773 A1 | 3/2017 | Beeken |

OTHER PUBLICATIONS

International Preliminary Report on Patentability for Application No. PCT/US2018/039457, dated Dec. 31, 2019, 9 pages.

* cited by examiner

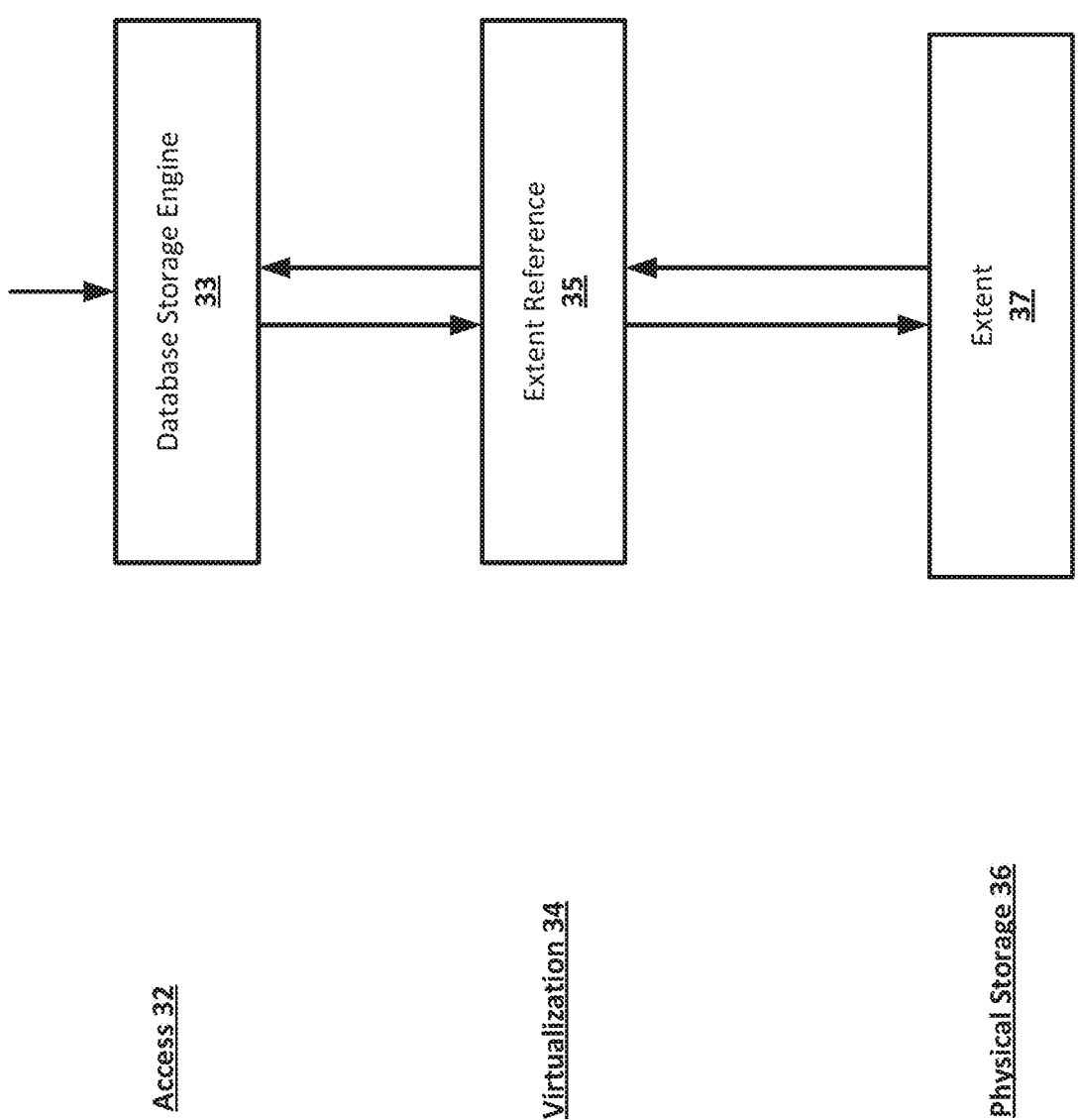

FIG. 4F

Snapshot, X4

| Eid | Key Start | Key End | Xst | Xend |
|-----|-----------|---------|-----|------|
| E3  | Person1   | Person2 | x1  | x2   |
| E4  | Person3   | Person4 | x3  | x4   |

FIG. 4J

Point-in-Time as of x5

| Eid | Key Start | Key End | Xst | Xend |
|-----|-----------|---------|-----|------|
| E3  | Person1   | Person2 | x1  | x2   |
| E4  | Person3   | Person4 | x3  | x4   |
| E5  | Person3   | Person5 | x5  | x5   |

FIG. 6C
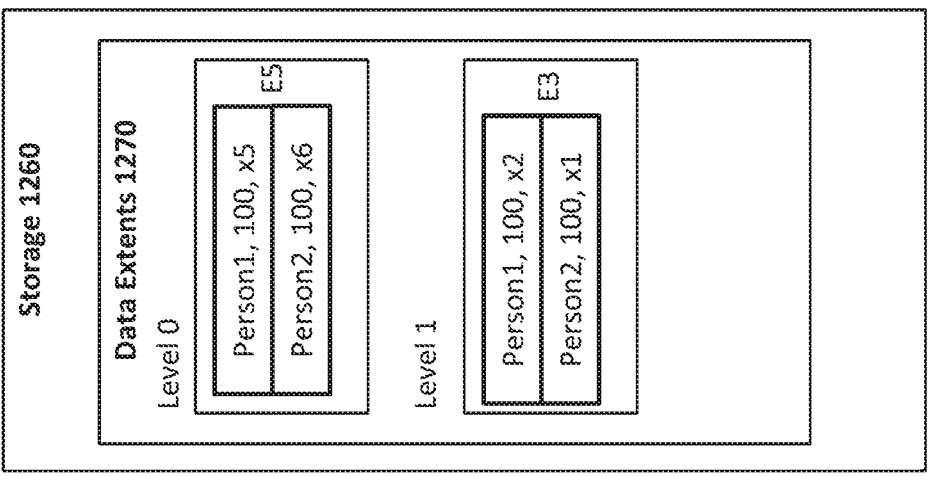
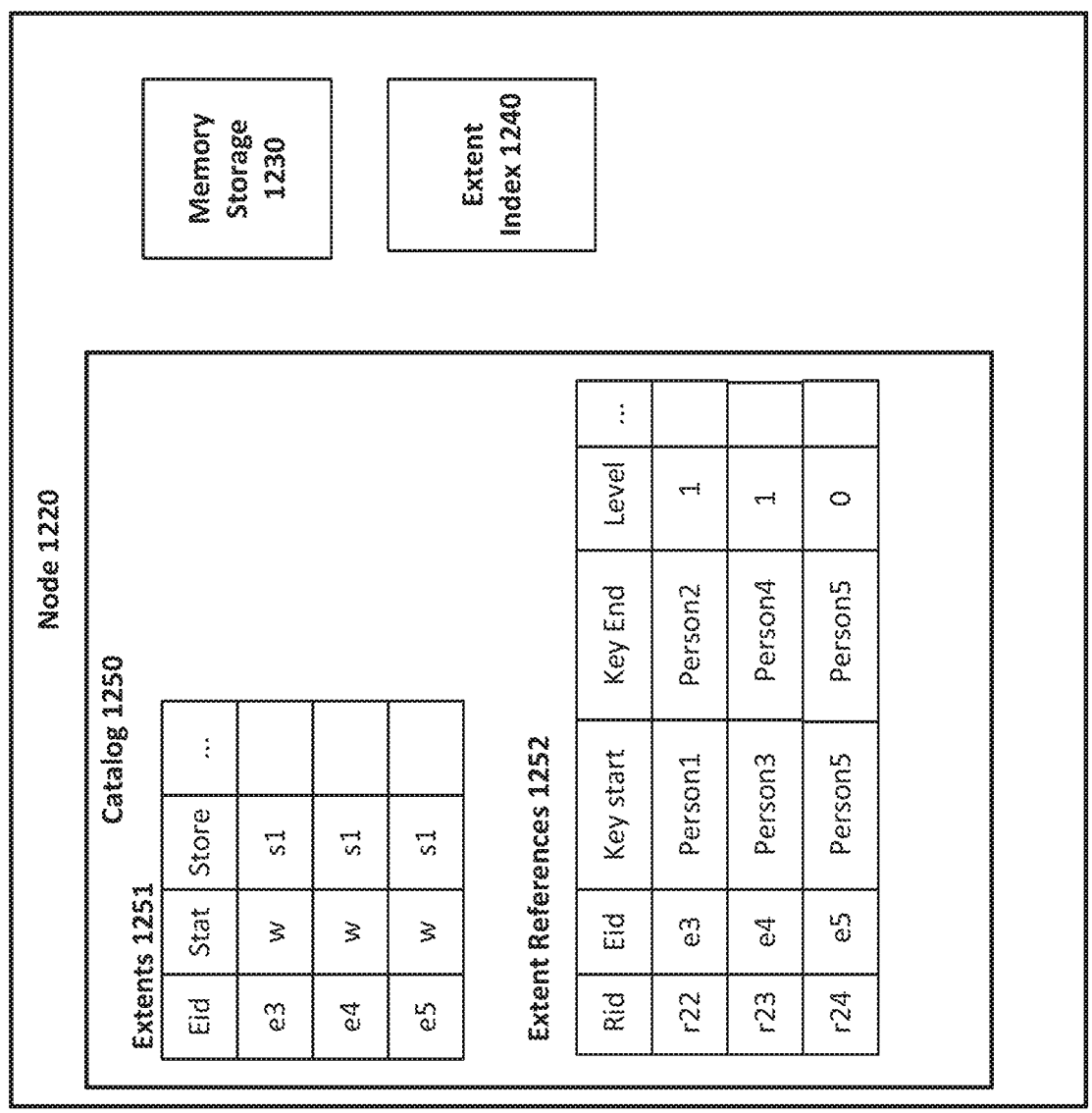

SYSTEMS AND METHODS OF RESTORING A DATASET OF A DATABASE FOR A POINT IN TIME

CROSS-REFERENCE TO RELATED APPLICATIONS

This application is a continuation of U.S. application Ser. No. 15/634,796, now U.S. Pat. No. 10,592,353, filed Jun. 27, 2017, the disclosure of which is incorporated by reference in its entirety.

BACKGROUND

Users of application or database systems often need to restore their data to a particular point in time. This typically occurs when a portion of the user's data in the system is corrupted. The user of the application or database system may request that the provider of such systems restore all the user's data to a point in time before the corruption. With typical systems, the user's data is restored to an approximate point in time before the corruption occurred. This approximate point in time of restore commonly does not have all the data prior to the corruption point detection.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than may be necessary for a fundamental understanding of the disclosed subject matter and various ways in which it may be practiced.

FIG. 3 shows an example system for storing and retrieving data for a point-in-time restore using a virtualization layer according to an implementation of the disclosed subject matter.

FIGS. 4A-4J show example systems and methods of inserting data and performing a point-in-time restore using a snapshot according to an implementation of the disclosed subject matter.

FIGS. 6A-6C show network configurations according to an implementation of the disclosed subject matter.

DETAILED DESCRIPTION

Figure 1A:
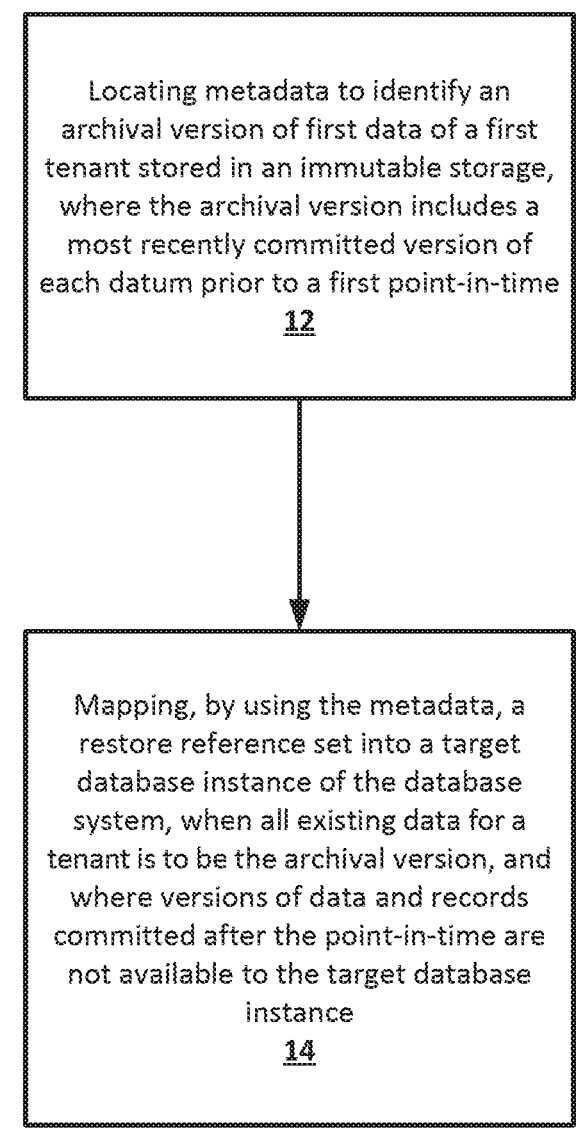
FIG. 1A shows an example method of performing a point-in-time restore of data of a first tenant of a multitenanted database system according to an implementation of the disclosed subject matter.

As users of application and/or database systems may need to accurately restore a dataset to a point in time in the past, implementations of the disclosed subject matter provide a point-in-time restore of a tenant's data in a database system without affecting other tenants having data in the same database. Restoring a tenant to a point in time is performed by locating archival information about the database that contains a full set of the tenant data prior to the desired point in time. The implementations of the disclosed subject matter have improved granularity over present systems for restoring tenant data to a particular point in time, without affecting other tenant data in the same database.

In the operation of application and/or database systems, a user may realize that their data has been corrupted, and may request that the application and/or database service provider give them access to their data as of a prior, specific point in time. In one scenario, the user may request that all their data be restored to the point in time before the corruption. In this case, the user may want to restore their database to a previous point in time, after which they may try to reconcile the changes that occurred after the corruption was detected. A more common scenario is that the user is unwilling to lose changes since the corruption was detected. In this case, the user may choose to gain access to the pre-corruption data and perform manual reconciliation and correction to the existing data, which can be inefficient and prone to errors.

Both of these scenarios are often impractical with application and/or database providers (e.g., cloud-based providers) that host multiple tenants into a single physical database. Tenants often require high availability of the database, and may find anything but a momentary outage unacceptable, even for a point-in-time restore. If multiple tenants are stored in a single database it may not be possible to restore a single tenant to a previous point in time in an existing database without affecting multiple tenants. Moreover, the process of restoring all or part of a database to a single point in time can take many hours during which new transactions cannot be processed.

A common solution to a situation like this is to provide the tenant with limited access to a previous version of tenant data. Conventional systems typically require many steps to provide a tenant with a point in time view of their data. Sufficient computer resources must be found to restore part of, or, in some instances, the entire database containing the tenant's data.

The common process may begin with a full backup of the data before the corruption occurred. Typically, incremental backups also may be added to restore the tenant data to a subsequent point in time after a full backup. An archived transaction log (e.g., a redo log or the like) is then applied to the most recent full backup preceding the desired point in time to bring the database up to the desired point in time. A form of an extract of the data as of the point in time can be generated and provided to the tenant. However, this process can take a very long time depending on the size of the database being restored and the resource availability, and requires additional hardware.

Implementations of the disclosed subject matter may provide a point-in-time restore of a tenant's data. The disclosed implementations reduce the time and resources of typical restore operations of prior systems, as they can be done nearly instantaneously without additional hardware (e.g., servers and/or other computing devices, additional storage devices, and the like), and they do not affect other tenants having data in the same system. The disclosed implementations may also more easily restore tenant data to a particular point in time.

That is, in implementations of the disclosed subject matter, data can be virtualized and can be mapped, to obviate the need for a log replay to bring tenant data of the database to a particular point in time. Extent references, as described in detail below, are used to virtualize access to the physical storage of the database. Extent references can be grouped into extent reference sets. All the persistence associated with a database instance may be contained in a single extent reference set.

Implementations of the disclosed subject matter may include immutable storage such as a Log Structured Merge (LSM) tree, a single key space rooted by a tenant identifier, and by using virtualization with extent references that point to extents stored in a storage device. As understood in the art and as used herein, an "extent" refers to a region of storage, typically continuous within a storage medium, which may be used to store data. Extents may be immutable. That is, the extents or individual datum within an extent may not be modified after they are created, such that the region or the data associated with the extent within the storage medium are not updated, but may be deleted in the future. An extent reference may be used as a logical reference to a physical extent that is stored in physical storage (e.g., a storage device), and may be used to virtualize access to the physical storage.

Further, in addition to using extents and immutability, different versions of a datum may be stored in the systems persistent storage. Distinguishing between versions of datum may be done by either using time stamps for each transaction for a given datum, or by using strictly monotonically increasing (or strictly monotonically decreasing) transaction numbers so that the time that a given version of a datum was created or committed to persistent storage can be tracked and used for later virtual point in time restores. Such time stamps or transaction numbers may be additional metadata associated with a key that may be tracked with the key.

Restoring a tenant to a point in time can be achieved by locating archival information about the database that contains a full set of the tenant data prior to the desired point in time. As described below, the archival information may include at least an initial archival set, and may include one or more incremental archival sets that may be used to restore the data to the desired point in time. This archival information is collected into a restore extent reference set where each extent reference sets a minimum key and a maximum key as a boundary range, which includes the references to the tenant data that is to be restored. For example, by examining the metadata for extents for the point in time (or the sequence number) for the most recent transaction in an extent, a system may readily determine which extents include at least one transaction that occurred before the desired point in time of a restore and may be included in the point of time restore.

Extent references generated after an initial archival set, but may contain tenant data before the target point in time, are located. An archival set may include an initial archival set and one or more incremental archival sets, where the archival set may be a union of the initial archival set and the one or more incremental archival sets. Extent references (e.g., each located reference) may be added to the restore extent reference set, which has the same minimum and/or maximum key mapping as the archival set of extent references. Extent references (e.g., each located reference) may be set to the desired restore point in time.

The restore extent reference set may be mapped into a target database. If the tenant wishes to replace all existing data with the point-in-time data, then the extent reference set is mapped into the target database, and the existing tenant key range is removed. If the tenant wishes to have the point-in-time restore appear as a different dataset without supplanting the existing tenant data, then the extent reference set can be mapped to a new 'sandbox' tenant identity as is more particularly described in U.S. patent application Ser. No. 15/345,914, filed Nov. 8, 2016, entitled "Formation and Manipulation of Test Data in a Database System," which is incorporated by reference herein in its entirety.

That is, a sandbox may be created for an original tenant at a point in time. The original tenant data stored in an immutable storage is associated with an original tenant identifier. The original tenant data as of the point in time for a virtual point in time restore may be used for a snapshot of the original tenant data that is accessible by a sandbox tenant. The sandbox tenant data may be changed without changing the original tenant data, and the original tenant data may be changed without changing the sandbox tenant data. The snapshot may be such that the original tenant data is made available to a sandbox tenant so that the sandbox tenant can access the original tenant data in the same manner as if a copy of the original tenant data was made, without copying underlying data. A sandbox tenant may be created at the request of an associated authorized user (e.g., a user that is authorized to access tenant data) by associating the sandbox tenant identifier with the snapshot of the original tenant data and with sandbox data created by the sandbox tenant subsequent to the sandbox creation point in time. The sandbox data created and/or modified by the sandbox tenant subsequent to the sandbox creation point in time may be inaccessible to the original tenant. Creating a sandbox, as well as creating and/or modifying sandbox data is described in detail in U.S. patent application Ser. No. 15/345,914, filed Nov. 8, 2016, entitled "Formation and Manipulation of Test Data in a Database System," which is incorporated by reference herein in its entirety.

When the restored data is accessed by the database system, the extent references may determine how the physical data is interpreted. For the restored data, some extent references may contain references to data that is newer than the tenant designated restore point-in-time. A filter (e.g., a transaction filter, as discussed in detail below) may be used to limit the physical data that can be presented to the rest of the database. The database provides a consistent snapshot of the data as of a point in time, which may be, for example, a commit timestamp. A scan going through an extent reference with a filter has a snapshot criteria when qualifying physical rows. This allows a point in time view, after the desired point in time, over data that spans the desired point in time, without physically reconstructing data artifacts as they were as of a point in time by replaying a database transaction log. That is, by using the filter, a query issued after a virtual point in time restore has taken place cannot see the data after the desired point in time. The filter may be used so that data after the desired point in time is not viewable. Because the extent references are metadata objects which can span many records (e.g., tens, hundreds, thousands, or millions of records, or the like), a virtual point-in-time restore using extent references with filters can be constructed quickly compared to scanning a time ordered log and applying records up to a desired point in time.

In implementations of the disclosed subject matter, the restored tenant data is completely transactionally consistent as of the desired point in time, and restoring a tenant has no impact on the other tenants that are hosted in the same database instance.

Because extent references are metadata objects which can span many records (e.g., thousands of records, millions of records, or the like), a virtual point-in-time restore using extent references with filters, as discussed in detail below at least in connection with FIGS. 4A-4J and FIGS. 6A-6C, can be constructed very quickly compared to scanning a time ordered log and applying records up to a desired point in time. Accordingly, implementations disclosed herein may allow for significantly more efficient operation of the underlying computer systems on which tenant data is stored and manipulated, as well as reducing the computing resources necessary to perform a point-in-time restore.

Figure 1B:
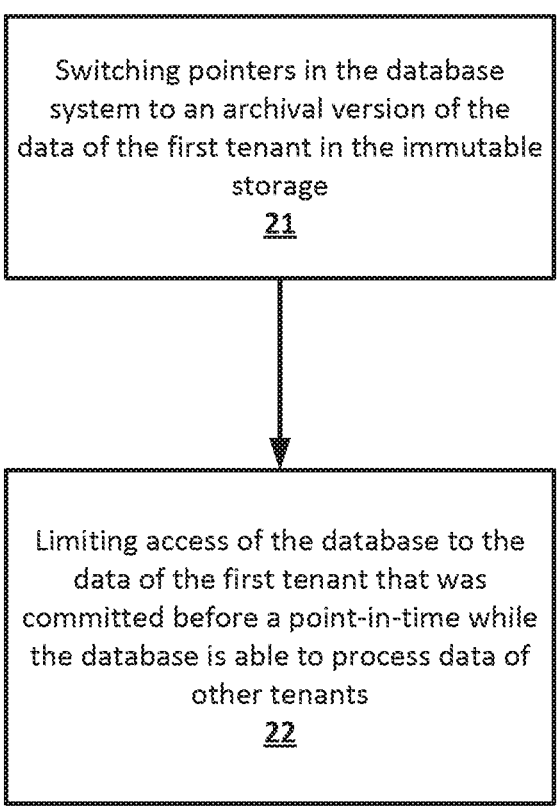
FIG. 1B shows another example method of performing a point-in-time restore of data of a first tenant of a multitenanted database system according to an implementation of the disclosed subject matter.

FIGS. 1A-1B show example methods of performing a point-in-time restore of data in connection with the systems shown in FIGS. 3-6C, as described in detail below.

FIG. 1A shows an example method 10 of performing a point-in-time restore of data of a first tenant of a multitenanted database system according to an implementation of the disclosed subject matter. The method 10 may be used in connection with the systems shown in FIGS. 3, 5, and 6A-6C, as described in detail below. For example, tenant data may be stored and retrieved using the virtualization layer 34 and the physical storage 36 shown in FIG. 3. A tenant may have tenant data stored in an immutable storage associated with a tenant identifier, such as storage 810 of second computer 800 shown in FIG. 5, database systems 1200a-d of FIGS. 6A-6C, and the like. For example, a database 1200a may include a one or more physical servers and/or virtual servers may include applications 1210, one or more nodes 1220, and storage 1260. The node 1120 may include memory 1230, extent index 1240, and a catalog of extents and extent references 1250. The storage 1260 may include data extents 1270. The catalog 1250 may have extents that refer to a region of continuous storage (e.g., storage 1260) to store data. The extent references of the catalog 1250 may be used as a logical reference to a physical extent that is stored in physical storage (e.g., storage 1260). That is, tenant data is may be stored in the data extents 1270 of the storage 1260. The storage 1260 may be a shared storage system. In some implementations, one or more nodes may point to the same data extents though different references.

The tenant data (e.g., stored in the storage 1260 in FIG. 6B) may be associated with a metadata tenant identifier and metadata (e.g., that may be stored in the node 1120 of FIG. 6B) that is indicative of when records are created and deleted from the database system. In implementations of the disclosed subject matter, there may be different versions of tenant data (e.g., that is stored in the data extents 1270 of FIG. 6B) that are committed to the database system from time to time.

At operation 12, metadata may be located by the database system to identify an archival version of data of a tenant stored in the immutable storage. The archival version may include a most recently committed version of each datum prior to a particular point in time. That is, restoring a customer to a point in time can be achieved by locating archival information about the database that contains a full set of the customer data prior to the desired point in time. Since data in the immutable storage of the database system (e.g., storage 810 of second computer 800 shown in FIG. 5, database systems 1200a-d of FIGS. 6A-6C, and the like) is never really deleted, the archival information may be data that has been previously written that is not the current tenant data.

This metadata locating the archived data may be collected into a restore extent reference set operation, where each extent reference sets a minimum key and a maximum key, as described in detail below. These keys are set to define the limits for the customer data that is being restored.

At operation 14, the database system may map, by using the metadata, a restore reference set into a target database instance of the database system. In operation 14, the mapping may include using all existing data for the tenant as the archived data. Versions of data committed after the point in time may not be available to the target database instance.

In some implementations, the mapping the restore reference set into the target database instance may include restoring tenant data to be transactionally consistent as of the particular point in time. The restoration of the tenant data may not affect other tenants that are hosted in the target database instance of the database system.

In the virtual point in time restore method described in connection with FIGS. 1A-1B, as well as in the database systems described throughout in connection with FIGS. 3-6C, a record may be identified as a key-value pair in the instance of a multitenant system. Tenancy in the databases may be created, and an authorized user associated with a tenancy may view, access, and/or perform operations for that tenancy. The value may be, for example, the contents of a row of a table of a relational database, an identification of a row in a table of a relational database, or any other suitable value. The key may be an identifier for the record, and may in any suitable form, such as, for example, an alphanumeric sequence. Portions of the key may provide information about the contents of the record. For example, a portion of the key may be a tenant identifier, which may uniquely identify the tenant to whom the contents of the record belong. Other portions of the key may identify, for example, a table number and identification of a row, for example, when the value of a record is the contents of a row, or table number, index number on the table, and an identification of indexed columns when the value is the identification of a row.

The database system (e.g., system 30 shown in FIG. 3 or databases 1200a, 1200b, 1200c, and/or 1200d shown in FIGS. 6A-6C) may store transactions as immutable versions of given records. Immutable versions of contents of records already stored on the server system may be unchanged until the contents are deleted (if ever) from the server system. That is, a received transaction may create a new version of the contents of the record to be stored in the server system, instead of altering the contents of the record. Thus, it may be possible for multiple versions of a record (e.g., records having different contents) as disclosed herein to have identical keys except for transaction identifiers. The use of otherwise identical keys for versions of a given record may allow for the changing of data stored in the relational database. As such, each version of the physical record may be immutable; i.e., it is either not deleted or is not deleted over an arbitrarily long period of time that may be months, years or decades. For example, a later version of a record with an identical key (other than the transaction version identifier) to an earlier version of the record may indicate a change in the data value for that record (i.e., the change in contents of the record). Alternatively, a transaction may create a record or delete a record (i.e., create contents or delete contents). Records may be deleted by inserting a 'tombstone' (e.g., a marker identifying the data to be deleted), and, at a future point in time, a new extent can be written which no longer includes the record marked by the tombstone.

Time stamps or other time identifiers may be made at the creation of a tenant. Thereafter, tenant data may interpret primary key requests for versions of the data before the time stamp by accessing the appropriate version based on the key in the pool of the data stored before the time stamp. Keys for the respective tenants accessing data created or updated after the time stamp will be interpreted to access the appropriate data created by the tenant. Alternatively, rather than using time stamps, each transaction in the database may have a unique transaction number associated with it that is monotonically increasing for each subsequent transaction and the system may note the most recently created transaction identifier in lieu of the time stamp.

Figure 2:
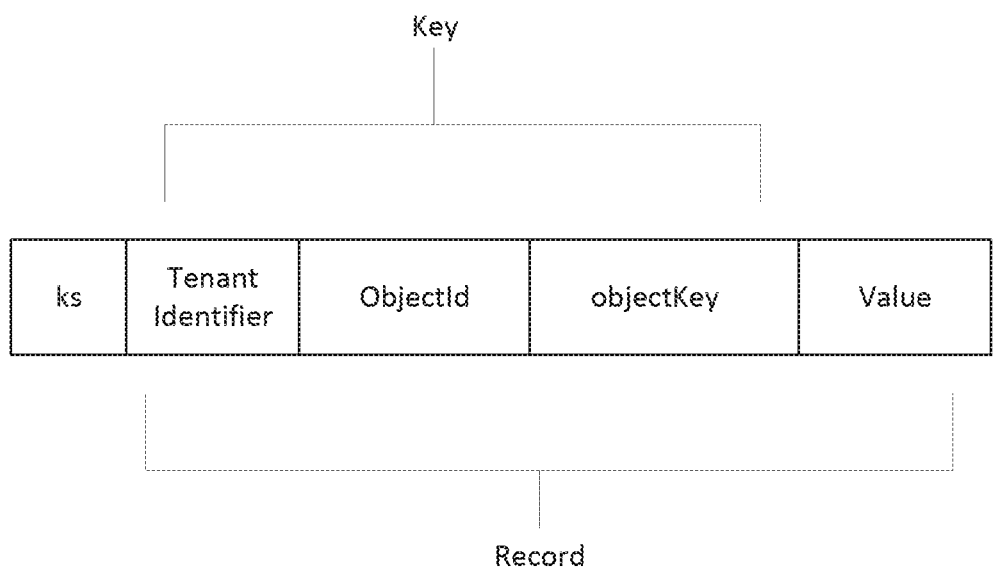
FIG. 2 shows an example of a record in a database system according to an implementation of the disclosed subject matter.

FIG. 2 shows an example record used in a database system (e.g., system 30 shown in FIG. 3, system 50 shown in FIGS. 4A-4J, database systems 1200a-1200d shown in FIGS. 6A-6C) according to an implementation of the disclosed subject matter. Records can be keyed by a keyspace (ks), a tenant identifier, an object identifier (objectId), and/or an object key (ObjectKey). As shown in FIG. 2, the record may include the tenant identifier, the objectId, and the objectKey. The key of the record may include the tenant identifier, the objectId, and the objectKey. In implementations of the disclosed subject matter, the keys and/or the values may be variable in length. As discussed above, data extents in implementations of the disclosed subject matter may be sorted by key, and organized by levels in a LSM tree according to a commit time. The database system as disclosed herein may have an immutable storage, which may be used in relational database that stores persistent contents of records, a single key space rooted by a tenant identifier, and by using persistence virtualization. The persistence may be made up of extents. An extent is a typically contiguous region of storage which may be used to store data. As discussed above, extents may be immutable and may be ordered by key.

Figure 4A:
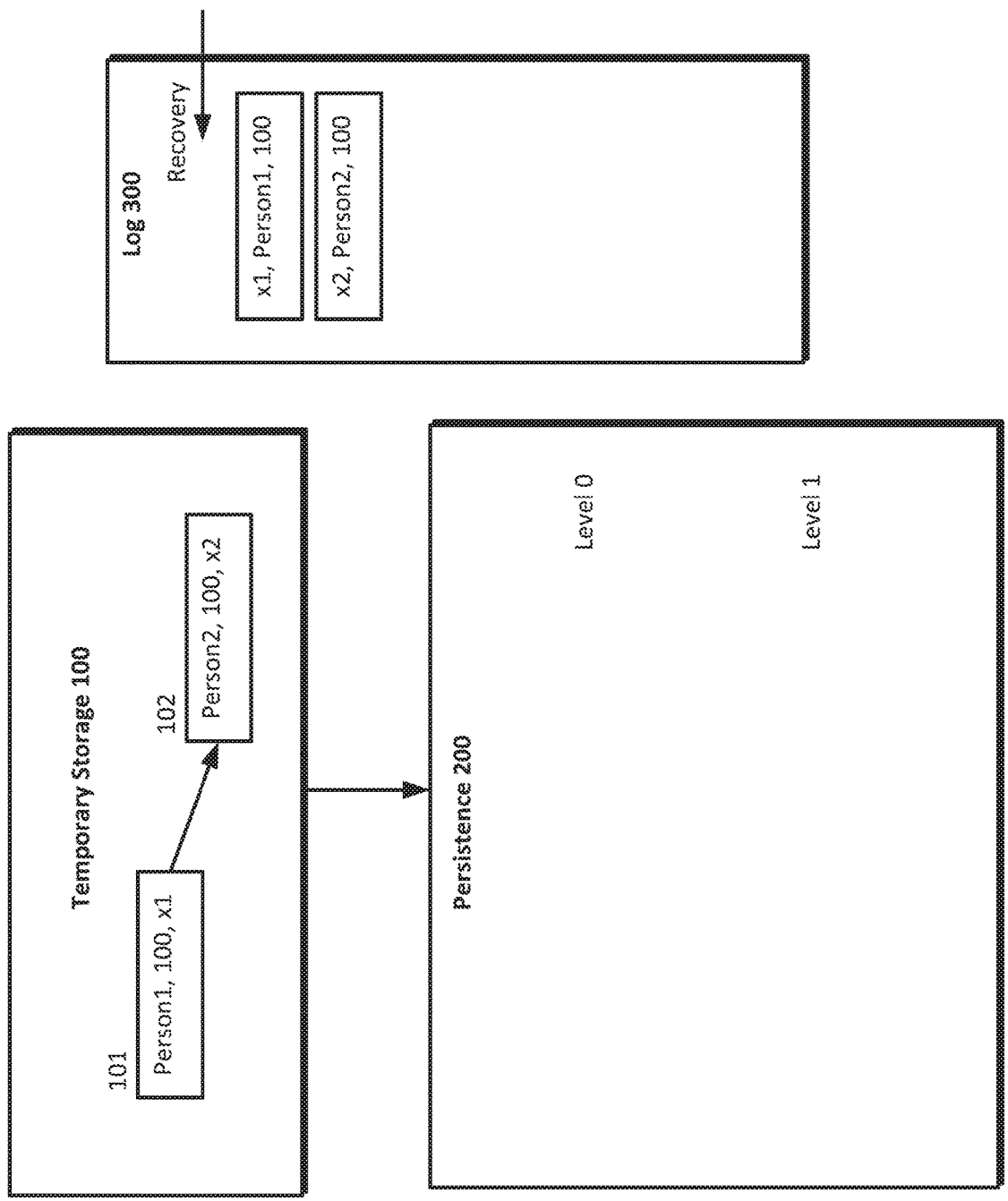
Figure 4B:
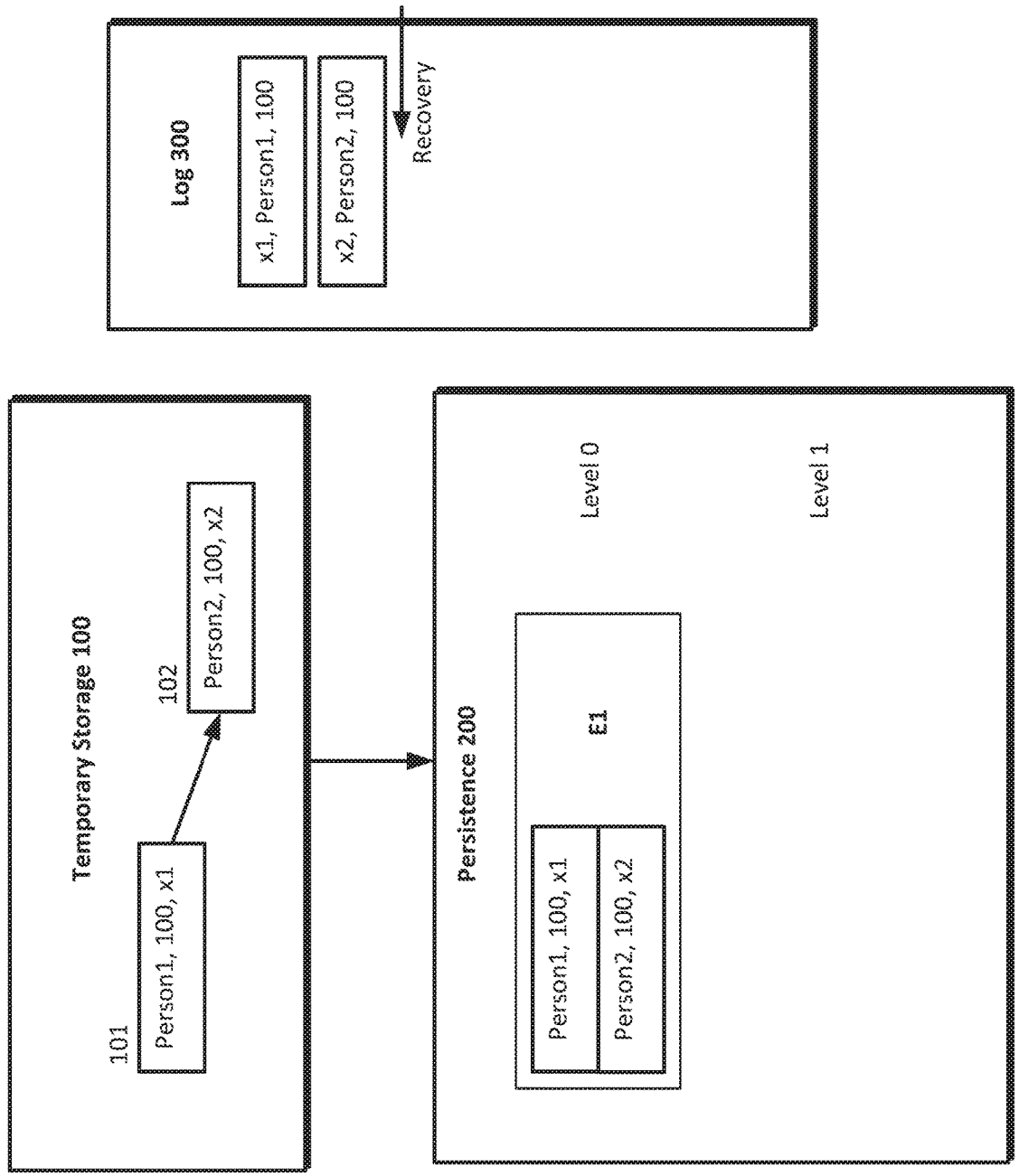
Figure 4C:
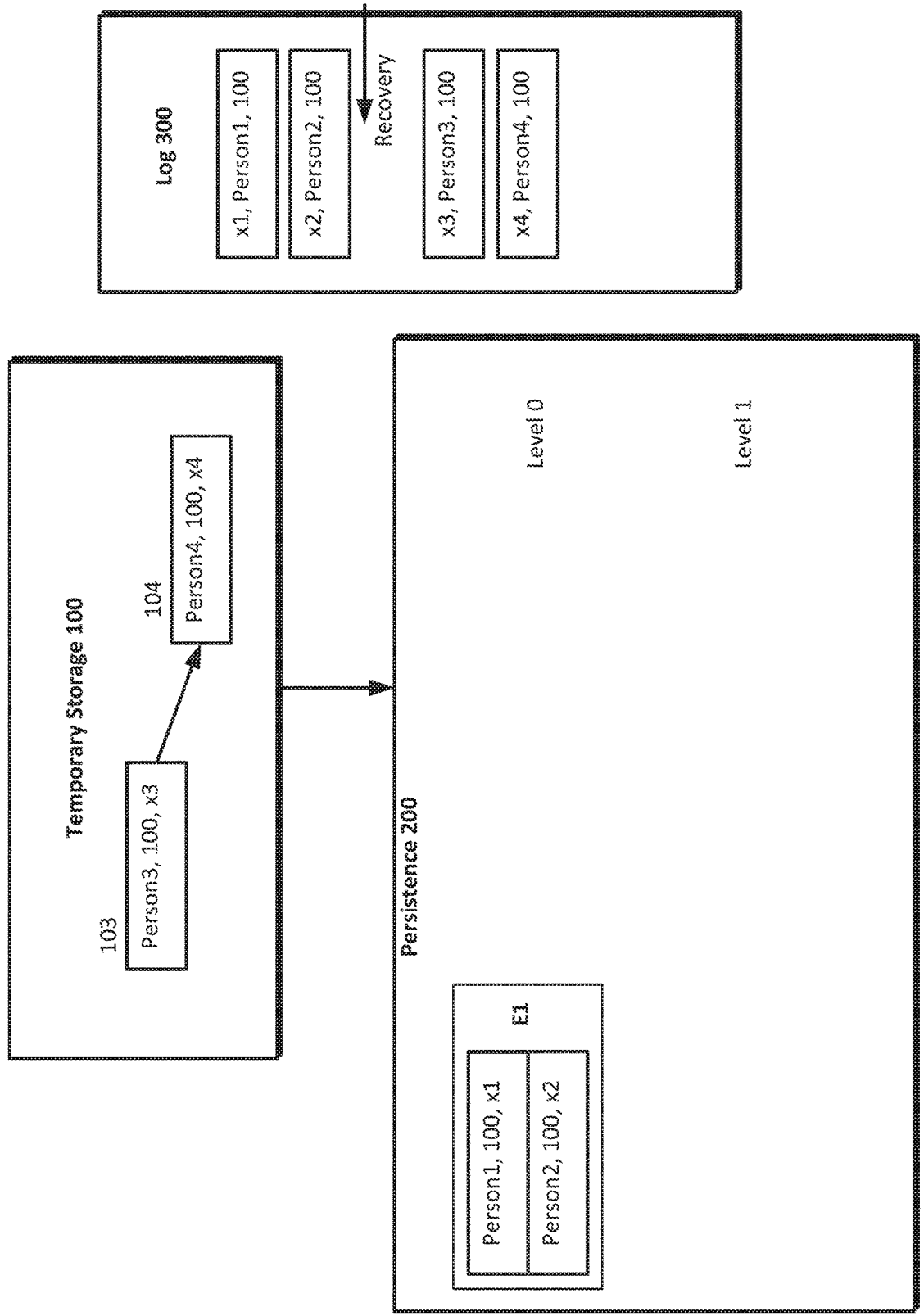
Figure 4D:
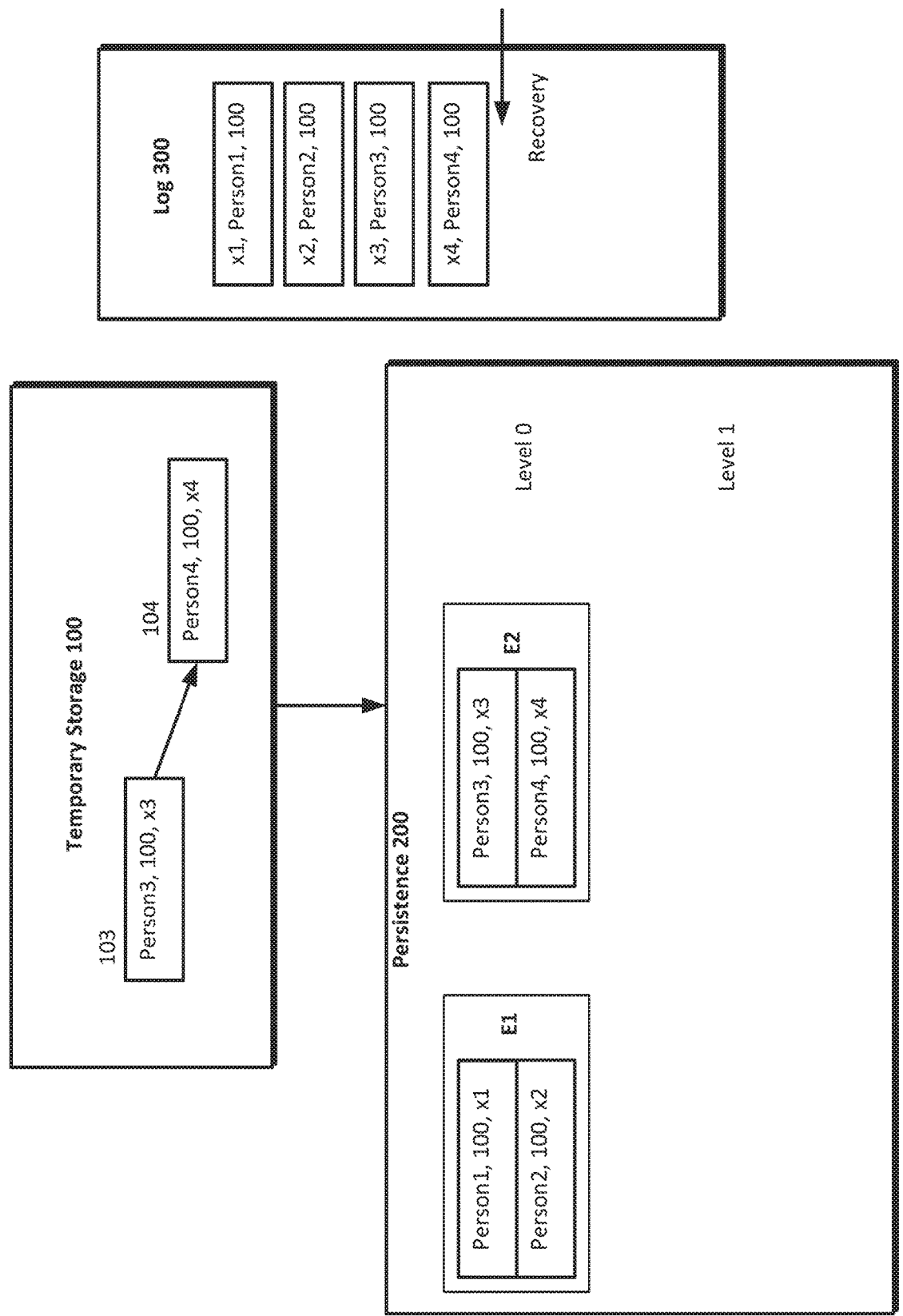
Figure 4E:
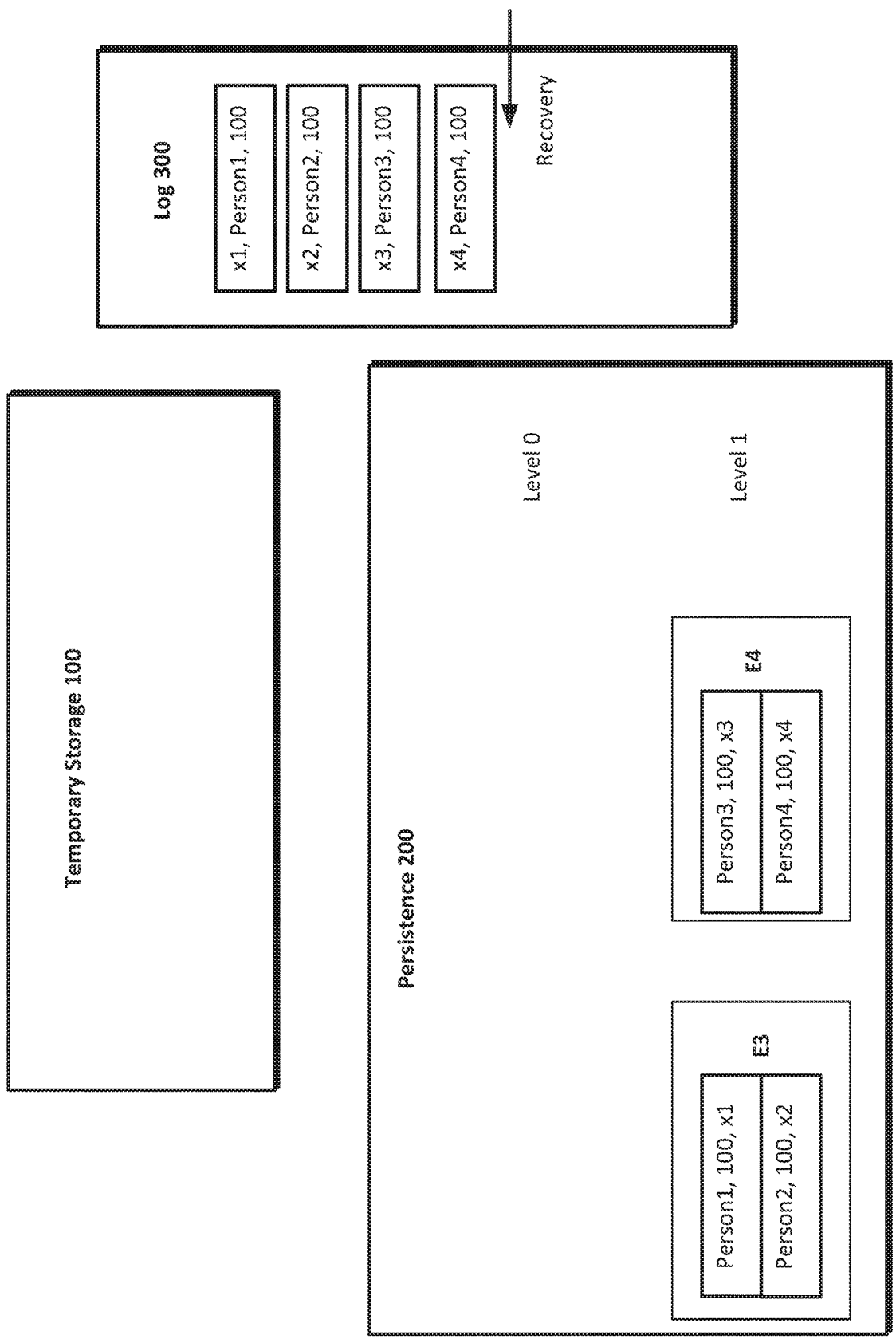
Figure 4G:
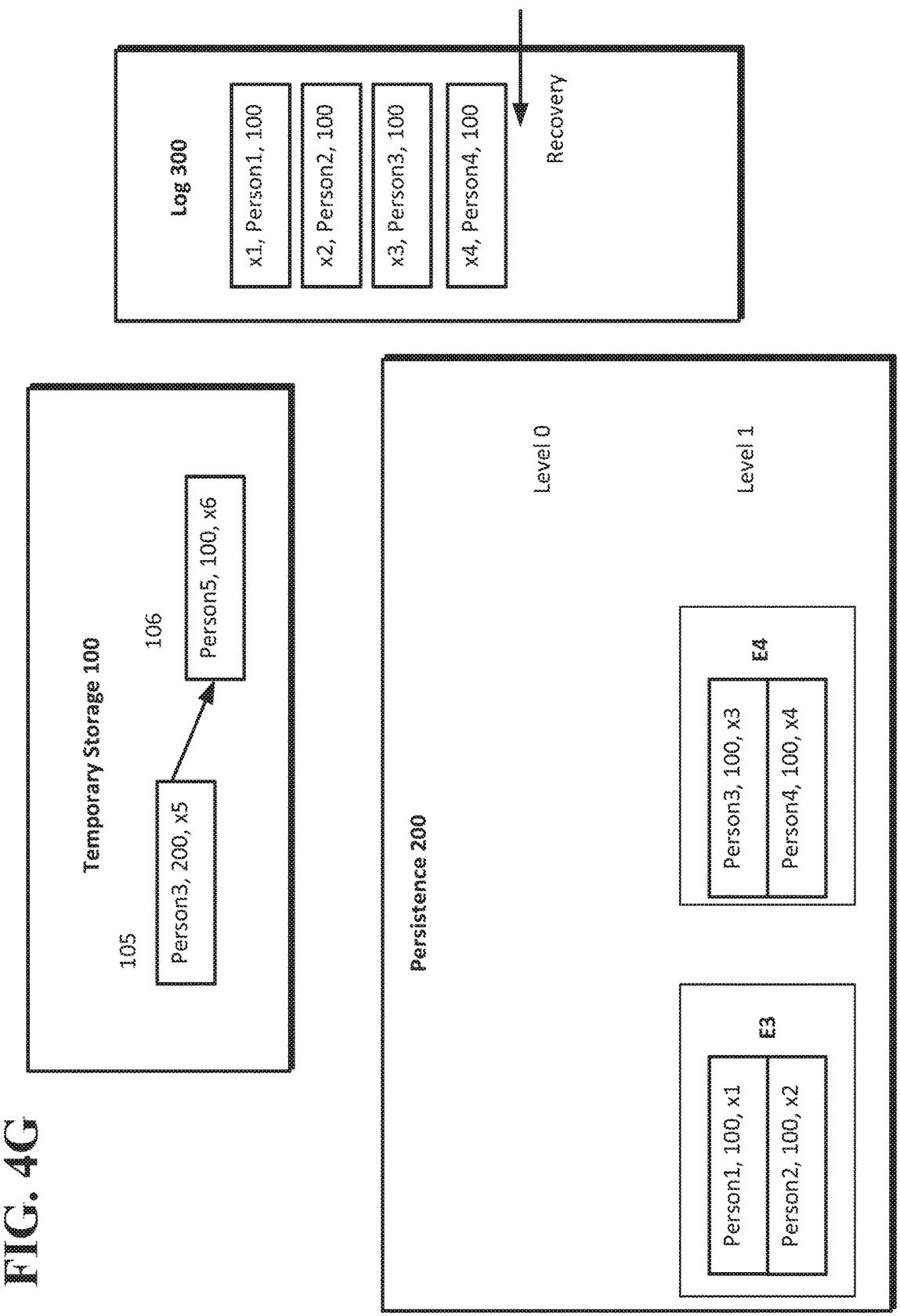
Figure 4H:
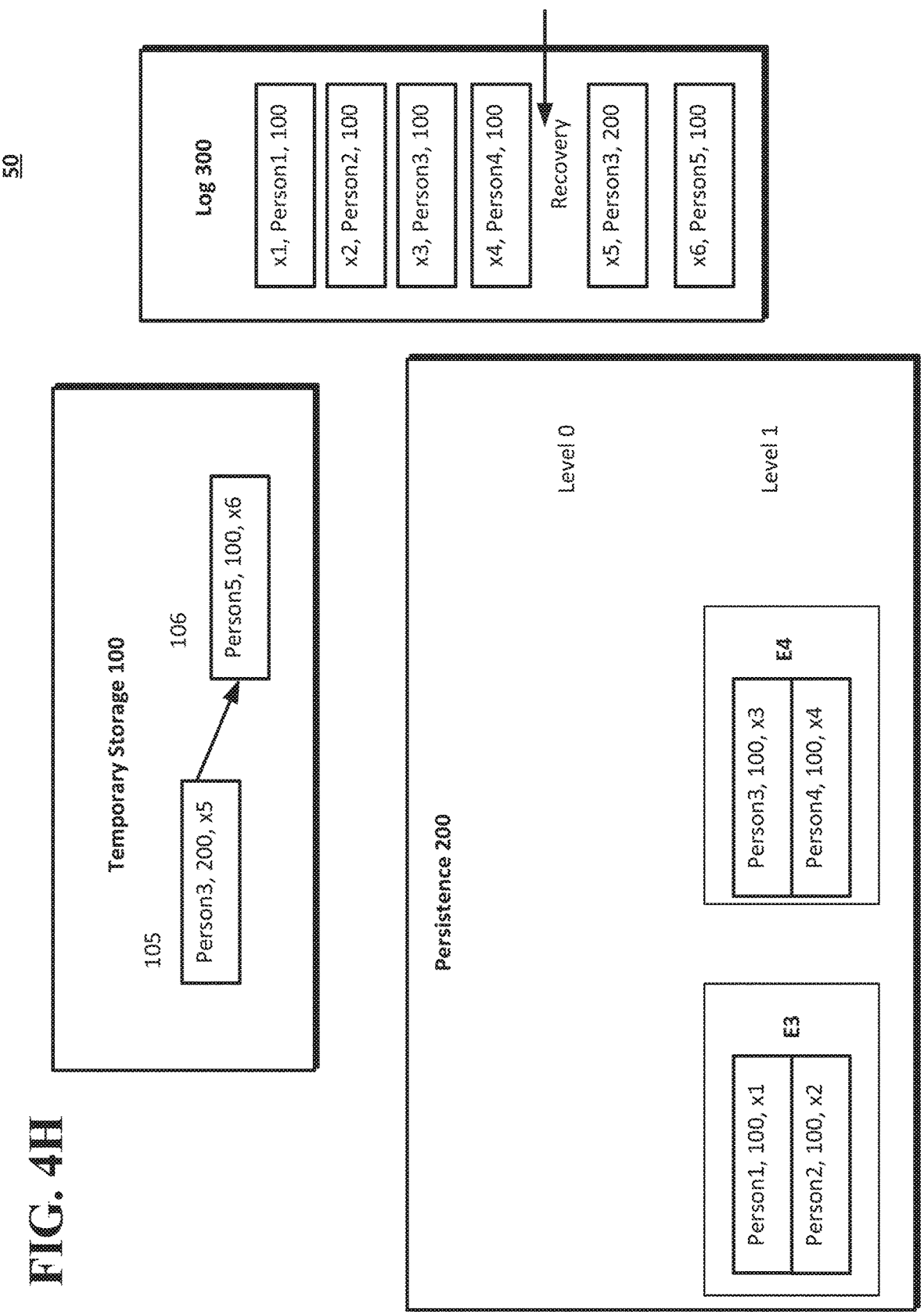
Figure 4I:
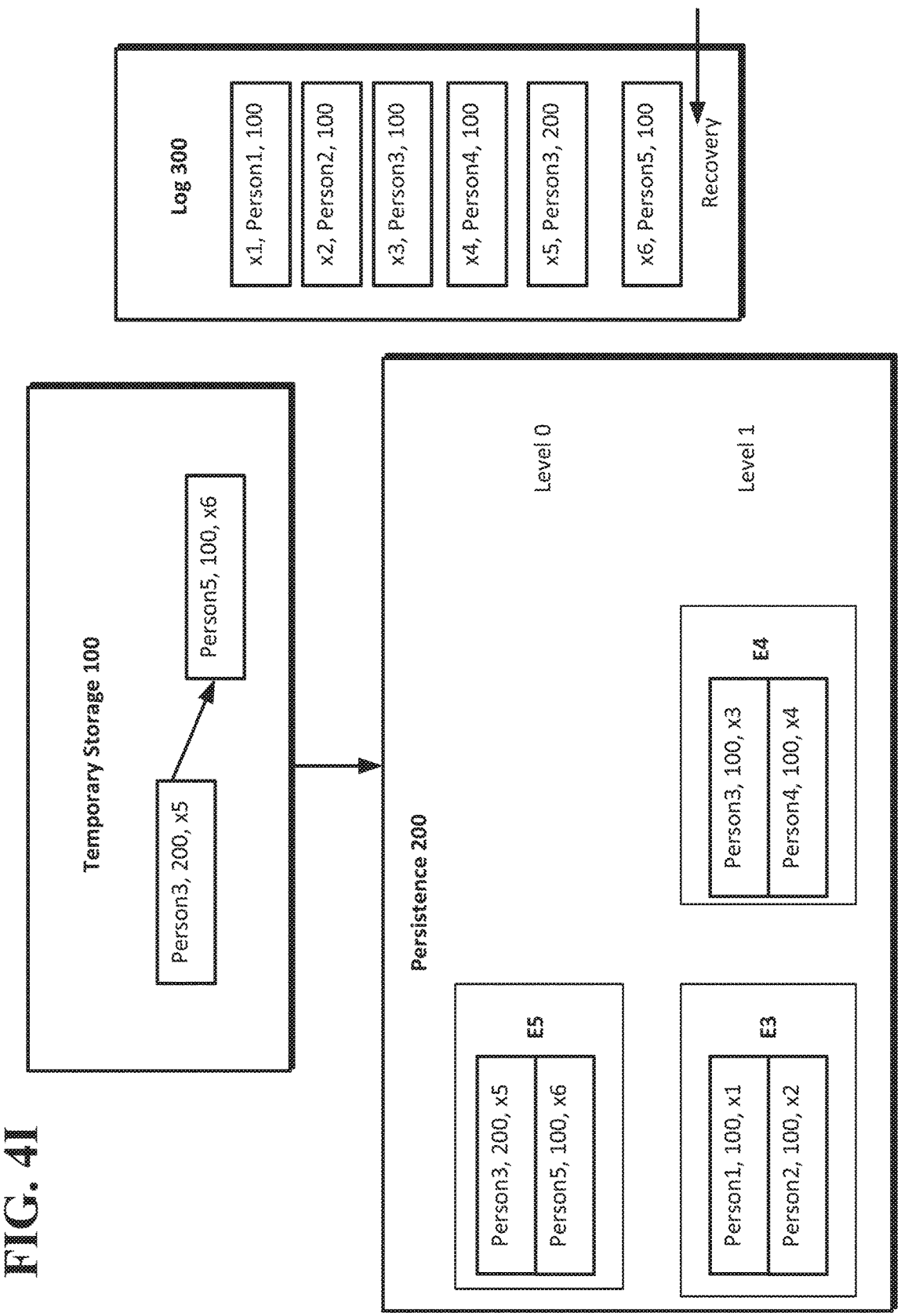

In implementations of the disclosed subject matter, data extent references may be organized into level (see, e.g., FIG. 4I, which shows extent E5 at level 0, and extents E3 and E4 at level 1). A level may cover a single key range that may be grouped into data extents references that are ordered by key.

Reducing and/or minimizing a number of levels of organized data may increase the rewriting of data as new data arrives. Each level may have a maximum size threshold, and the level sizing may increase exponentially. When the size threshold is exceeded, a merge operation may be performed by the database system (e.g., system 30 of FIG. 3, system 50 of FIGS. 4A-4J, and/or database systems 1200a-1200d shown in FIGS. 6A-6C), where data is merged from level N to level N+1.

Data is not moved from the memory storage of the database system (e.g., memory storage 1230 shown in FIGS. 6B-6C) until data has been made persistent via a flush operation, and queries have moved up to latest view of persistence. For example, in a flush operation, data is copied from the memory storage 1230 to the storage 1260 shown in FIGS. 6B-6C. That is, in the flush operation, one or more extents are moved from the memory storage 1230 to the storage 1260 (i.e., persistent storage). This may be done in key order for a particular transaction range. Recovery information may be written to the catalog 1250. This information may include a recovery start point, which may include an extent and a fragment offset. A recovery transaction threshold may be the highest transaction value from the last flush operation. When the data has been copied from the memory storage 1230 to the storage 1260, the data that was copied may be removed from the memory storage 1230.

An extent reference may include an extent identifier, a minimum key, a maximum key, an original tenant identifier, a new tenant identifier, and a filter (e.g., a transaction filter). An extent reference may include an extent identifier (ExtentId), which may identify the physical extent to which this points. A minimum key of an extent reference may be minimum key value that the extent reference can access. The minimum key may be the minimum key in the extent. The maximum key of an extent reference may be the maximum key value that the extent reference can access. The original tenant identifier may be set to indicate a production tenant if the tenant data is to be sandboxed. The new tenant identifier may be the new tenant, so that when the tenant is data is being sandboxed, the new tenant identifier is set to sandbox. The extent reference may have a transaction filter, which may correspond to the maximum value of a commit timestamp that indicates when the record came into existence so that the extent reference can 'see' in this extent. As discussed below, the filter (e.g., transaction filter) and transaction identifiers may be used to point to the desired data in storage as of a virtual point in time restore.

An extent reference may be used as a logical reference to a physical extent that is stored in physical storage (e.g., a storage device), and the extent references may virtualize access to the immutable storage. For example, as shown in FIG. 3, FIG. 6B, and FIG. 6C, and described in detail below, extent references (such as extent reference 35 shown in FIG. 3, or extent references 1252 shown in FIG. 6C) may be part of a virtualization layer 34, which points to an extent 37 in a physical storage 36. Similarly, as shown in FIGS. 6B-6C, the extent references 1252 of catalog 1250 may point to the data extents 1270 of the storage 1260. At least a portion of the extent references (e.g., the extent references 1252 shown in FIG. 6C) may be grouped into an extent reference set (e.g., that is part of the virtualization layer 34) that points to a persistence associated with a database instance of the database system (e.g., an extent 37 in the physical storage 36 as shown in FIG. 3, or an extent within the data extents 1270 of the storage 1260 shown in FIG. 6C). Each extent reference of the extent reference set may include a minimum key and a maximum key to set a boundary range for the tenant data that is to be restored. For example, each of the extent references 1252 of FIG. 6C include a "key start," which may be a minimum key, and a "key end," which may be a maximum key of a boundary range (e.g., the boundary range for a tenant to be restored). The extent index 1240 shown in FIGS. 6B-6C allows a node 1220 of the database system 1200a, 1200b, 1200c, and/or 1200d to access the tenant data (e.g., in the data extents 1270) for the boundary range for the tenant data to be restored from the storage 1260.

Extent references after the archival information (e.g., an initial archival set and/or one or more incremental archival sets) of the first data may be located. Here, the archival information contains tenant data before the first point in time. Each of the located extent references may be added to the restore reference set, which has the same minimum key and the same maximum key mapping. The database system can access the restored tenant data. When at least some of the extent references contain references to data in the immutable storage that is newer than the first point in time, the data to be presented can be filtered, as described below in connection with at least FIGS. 4F-4J.

In some implementations, the method 10 of FIG. 1A may include restoring the tenant prior to a first point in time, and updating the restored tenant data with data committed at or before the first point in time. This is also shown and described in detail below in connection with at least FIGS. 4F-4J.

FIG. 1B shows another example method of performing a point-in-time restore of data of a tenant of a multitenanted database system according to an implementation of the disclosed subject matter. The method 20 may be used in connection with the systems shown in FIGS. 3, 5, and 6A-6C, as described in detail throughout. Similar to the method 10 described above in connection with FIG. 1A, the method 20 may have tenant data stored in an immutable storage (e.g., storage 810 of second computer 800 shown in FIG. 5, database systems 1200a-d of FIG. 6A-6C, and the like) associated with a tenant identifier.

The method 20 may be for performing a point-in-time restore of data of a tenant of a multitenanted database system using a single database to support multiple tenant instances. The database system may store tenant data in the immutable storage, and may commit or delete versions of records from the single database.

At operation 21, pointers to the current extents or other metadata indicating the data to be processed by the database system may be switched to archival data of the tenant in the immutable storage. Similar to the process discussed above, the archival data may include a most recently committed version of each datum prior to a particular point in time and any prior versions of those data. Restoring a customer to a point in time can be achieved by locating archival metadata information about the database that points to or otherwise directs the system to a full set of the customer data prior to the desired point in time. Pointers may be switched to the located archival information. The archival data may be data that has been previously written that is not the current data of the tenant. To retrieve the archival data, database pointers are moved to point to transactions that are earlier in time (than the present time to perform a point-in-time restore operation) and disregarding the transactions that occurred after that time. These pointers set the limits for the customer data that is being restored for a point in time.

At operation 22, the method may limit access of the database of the data of the first tenant that was committed before a point in time while the database is able to process data of other tenants.

FIG. 3 shows an example system for inserting and/or updating records, and/or for performing a point-in-time restore, such as those shown in FIGS. 1A-1B and 4A-4J and described throughout, according to an implementation of the disclosed subject matter. The system 30 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. For simplicity, components such as the processor, short and long term storage, the operating system, much of the database management system are not shown. The server system 30 may be part of a computing system and network infrastructure, or may be otherwise connected to the computing system and network infrastructure, including a larger server network which may include other server systems similar to the server system 30. In some implementations, the system 30 may be the computer 600, central component 700, and or the second computer 800 shown in FIG. 5, and/or one or more of the database systems 1200a-1200d shown in FIGS. 6A-6C.

An access layer 32 of the system 30 may have a database storage engine 33, which may receive or complete a query and/or instruction for the database system (e.g., central component 700 shown in FIG. 5 and/or database systems 1200a-1200d shown in FIG. 6A-6C) from a computing device (e.g., computer 600 and/or a second computer 800 shown in FIG. 5) regarding data. The query may be for particular data from a tenant, and/or may be an instruction to insert and/or update data of a tenant. The database storage engine 33 may be any suitable combination of hardware and software on the server system 30 for receiving queries for the database system, and retrieving data related to the received query and/or instruction.

The system 30 may include a virtualization layer 34, which may have an extent reference 35. In some implementations, the extent reference 35 may be part of the central component 700 shown in FIG. 5 and/or database systems 1200a-1200d shown in FIGS. 6A-6C. The extent reference 35 may be any suitable combination of hardware and software on the system 30 to perform as the virtualization layer 34 between the database storage engine 33 and physical storage 36 (e.g., where extents may be stored as part of extent 37, as described below). The physical storage 36 may be semiconductor memory, a solid-state drive (SSD), hard disk drive, optical memory, an optical storage device, or any other suitable physical data storage medium, or some combination thereof.

FIGS. 4A-4J show an example system 50 and method of inserting data and performing a point-in-time restore using a snapshot according to an implementation of the disclosed subject matter.

The system 50 may be a database system, server system, cloud server system, or the like. The system 50 may include temporary storage 100, persistence 200, and log 300. The persistence 200 may have one or more servers and/or computers associated with it (e.g., computer 600 and/or computer 800 shown in FIG. 5, and/or database systems 1200a-1200d shown in FIGS. 6A-6C). The temporary storage 100, may be any suitable combination of hardware and software on the system 50 for storing key ranges for data in extents before a "commit" or "flush" operation to store the information in persistence 200, which may be may be any suitable combination of hardware and software on the system 50 for storing data extents and data extent references. Log 300 may be any combination of hardware and software on the system 50 to keep a record of transactions that have been processed by the system 50.

As shown in FIG. 4A, an insert operation 101 may be processed by system 50. In this example, the keys will comprise a person id (e.g., Person1, Person2, etc.) and a transaction identifier (x1, x2, etc.) so that org id (e.g., a tenant), table, row and other common key information is omitted for purposes of clarity. In this example, the data "Person1, 100, x1" may be added to temporary storage 100. A second insert operation 102 may add the data "Person2, 100, x2," which may be stored in temporary storage 100. The log 300 may keep a separate record of the insertion operations 101 and 102, as shown in FIG. 4A, as transactions x1 and x2 (with x1 and x2 denoting the sequence of the transactions). A recovery point for the log 300 may be positioned before the recordation of the insertion operations 101, 102 (i.e., before the log record with the transaction identifier x1, as shown in FIG. 4A).

As shown in FIG. 4B, a "flush" operation may be performed by the system 50 to record the insert operations 101 and 102 in persistence 200 (e.g., at level 0 of a log structured merge tree)) as E1 (extent 1) that includes transactions x1 and x2. That is, the flush operation may remove the transactions from the insert operations 101 and 102 from the temporary storage 100 and store them as part of E1 at level 0 in the persistence 200. The system 50 may adjust the recovery point in the log 300 to a position that follows the operations 101, 102 (i.e., after the log record with the transaction identifier x2, as shown in FIG. 4B).

FIG. 4C shows additional, subsequent insert operations that are processed by the system 50. Insert operation 103 may add the data "Person 3, 100, x3" to the temporary storage 100, and insert operation 104 may add the data "Person4, 100, x4" to the temporary storage 100. As shown in FIG. 4C, the recovery point may be in the position that follows the operations 101, 102 (i.e., after the log record with the transaction identifier x2). The insert operations 103 and 104 may be recorded by log 300 as first subsequent transaction x3 and second subsequent transaction x4.

As shown in FIG. 4D, a flush operation may be performed by the system 50 to record the insert operations 103 and 104 (i.e., transactions x3 and x4) in persistence 200 (e.g., at level 0) as E2 (extent 2). The persistence 200 also includes data from the insert operations 101 and 102 as part of extent E1 (i.e., transactions x1 and x2). The recovery point in the log 300 may be adjusted by the system 50 to a position that follows the operations 103, 104 (i.e., after the log record with the transaction identifier x4, as shown in FIG. 4D).

A merge operation, as discussed above, may be performed on the extents E1 and E2 of level 0 in the persistence 200 to form extents E3 and E4 in level 1 of the persistence 200, as shown in FIG. 4E. The recovery point in the log 300 may be in a position that follows the operations 103, 104 (i.e., after the log record with the transaction identifier x4, as shown in FIG. 4E). Although a point-in-time restore may be performed by the system 50 using level 0 extents, in some implementations, the system 50 may have more efficient access to a particular point in time if the level 0 extents are merged to form level 1 extents, and a snapshot of the tenant data is taken. That is, there may be less information to read and/or search with data at level 1 than at level 0, and thus the data for the point-in-time restore may be more quickly located for the restore operation.

FIG. 4E shows the merged extents E1 and E2 as extents E3 and E4 at level 1 in the persistence 200. The log 300 shows the four transactions (i.e., x1, x2, x3, and x4) of the insertion operations performed by the system 50. In the examples shown in FIGS. 4E and 4F, a snapshot of the tenant data may be taken at this point in time as of completion of the transaction x4 in the log 300 (which coincides with the recovery point in the log 300). The snapshot of the tenant data may be such that the original tenant data is made available to be accessed in the same manner as if a copy of the original tenant data was made, without copying underlying data.

As shown in the snapshot of the tenant data as of the transaction x4 in FIG. 4F, the extent E3 may have a starting key that is associated with the data that includes Person1, and an ending key that is associated with the data that includes Person2. The first transaction for the extent E3 may be the transaction x1, and the ending transaction for extent E3 may be transaction x2. The extent E4 may have a starting key for the data that includes Person3 and an ending key for the data that includes Person4. The first transaction for the extent E4 may be the transaction x3, and the ending transaction for extent E4 may be transaction x4.

FIG. 4G shows insertion operations after the snapshot is taken as of the point in time at transaction x4. Update operation 105 may add "Person3, 200, x5" to the temporary storage 100 to update the value (i.e., 200) associated with Person3. Insertion operation 106 may add "Person 5, 100, x6" to the temporary storage 100. The recovery point in the log 300 may be in a position that follows the operations 103, 104 (i.e., after the log record with the transaction identifier x4, as shown in FIG. 4G). The log 300 may reflect the new x5 and x6 transactions for the update and insertion operations 105 and 106, as shown in FIG. 4H. As shown in FIG. 4I, a flush operation may be performed by the system 50 to form extent E5 at level 0 of the persistence 200. E5 may include the transactions of "Person 3, 200, x5" and "Person5, 100, x6." The recovery point in the log 300 may be adjusted to be in a position that follows the operations 105, 106 (i.e., after the log record with the transaction identifier x6, as shown in FIG. 4I).

FIG. 4J shows point-in-time data as of x5. The extent E3 may have a starting key that is associated with the data that includes Person1, and an ending key associated with the data that includes Person2. The first transaction for the extent E3 may be the transaction x1, and the ending transaction for extent E3 may be transaction x2. The extent E4 may have a starting key for the data that includes Person3 and an ending key for the data that includes Person4. The first transaction for the extent E4 may be the transaction x3, and the ending transaction for extent E4 may be transaction x4. Extent E5 may have a starting key for the data that includes Person 3, and an ending key for the data that includes Person5. The first transaction of the extent E5 may be x5, and the ending transaction may be x5.

In one implementation, to perform a point-in-time restore as of x5, the snapshot taken at x4 (see, e.g., FIG. 4D) may be used, and the changes may be replayed by the database system from the log 300 to restore the data as of the point in time as of x5. Using the log 300, the system 50 may add the data of "Person3, 200, x5" to the temporary storage 100 to update the value (i.e., 200) associated with Person3, which is the transaction associated with x5. The system 50 (or the node 1220 of the database system 1200a-1200d shown in FIGS. 6A-6C) may locate archival information about the database that contains a full set of the tenant data prior to the desired point in time at x5. This information is collected into a restore extent reference set (e.g., that may be part of the extent references 1252 shown in FIG. 6C), where each extent reference sets the minimum key and the maximum key for the tenant data to be restored up to the desired point in time at x5. After the data is restored to the point in time as of x5, the x6 transaction (shown in FIGS. 4H and 4I) may no longer be available.

In another implementation, the snapshot as of x4 may be used to perform a virtual point in time restore as of x5. The information of extent E5 may be added to the information provided by the snapshot of x4, but a transaction filter may be used so that the restoration is up to the transaction x5 and thus does not include the transaction x6 (i.e., as shown in the log 300 in FIG. 4I). The system 50 (or the node 1220 of the database system 1200a-1200d shown in FIGS. 6A-6C) may locate any extent references (e.g., extent reference E5 from persistence 200 of FIG. 4I, or the extents that may be part of the extent references 1252 shown in FIG. 6C) that were generated after the archival set but may include tenant data before the target point in time of x5. Each of these extent references may be added to the restore extent reference set with the same minimum key and maximum key mapping (e.g., the extent references 1252 of FIG. 6C may have the minimum and maximum keys for a key start and a key end). Each of these extent references may set the extent reference's transaction filter to the desired restore point in time of transaction x5. When the data is restored to the point in time as of x5, the x6 transaction (shown in FIGS. 4H and 4I) may no longer be available.

In this implementation, a request to restore a tenant's data to the point in time of the transaction x5 may be received. The system (e.g., system 30, system 50, database system 1200a-1200d) may locate the most recent snapshot (i.e., the snapshot of x4) of the database before the time of the x5 transaction. The database system may identify all extents in the located snapshot which may contain data for the tenant. These extents may be added by the database system to a restore extent reference set.

The database system may locate all the extents that were created after snapshot that includes the x5 transaction but before a snapshot that includes the x6 transaction. From the located set of extents, the database system may find the extents that may have data up to and including the x5 transaction for the tenant. From these extents, the database system may set the minimum key and the maximum key, and set a transaction filter based on time T if the extent includes data for the tenant that was committed after the desired restore point in time (e.g., the extent includes transactions after the x5 transaction).

That is, in implementations of the disclosed subject matter, such as those shown in FIGS. 4A-4J and FIGS. 6A-6C, a virtual point in time restore may be achieved by locating archival information in the storage device of the database system that contains a full set of the tenant data prior to the desired point in time. Note that this is not data that is retrieved from an offline data source, but is rather earlier versions of data stored within the LSM storage associated with the database. This information may be collected into a restore extent reference set, where each extent reference sets the minimum key and the maximum key boundaries for the tenant data that is to be restored. Alternatively, the database system may locate any extent references that were generated after the archival set (e.g., which include at least an initial archival set, and may include one or more incremental archival sets that may be used to restore the data to the desired point in time) but may contain customer data before the target point in time. For the archival set, a full copy of the data in the LSM tree may be made at a particular point in time (e.g., every day at the same time, twice a day, every hour, or the like). For a restore operation, the full copy may be located before the target point in time, and a particular tenant's data from the full copy may be located (e.g., the initial archival set). One or more incremental archival sets may be added to the initial archival set to arrive at the state of the data at the desired point in time.

Each of these extent references may be added to the restore extent reference set with the same minimum key and maximum key mapping range. Each of these extent references may set the extent reference's transaction filter to the desired restore point in time. Since the database system is gathering extent references, it is not necessary to create copies of the data.

The restore extent reference set may be mapped into a target database. If it is desirable to replace all existing data with the point in time data, the extent reference set may be mapped into a target database and the existing customer key range for data beyond that point in time may be removed. If it is desirable to have the virtual point in time restore appear as a different dataset without supplanting the existing tenant data, then the extent reference set can be mapped to a new sandbox tenant as in the manner disclosed in U.S. patent application Ser. No. 15/345,914, filed Nov. 8, 2016, entitled "Formation and Manipulation of Test Data in a Database System," for example, at paragraphs 33-37.

When the restored data is accessed, the extent references may determine how the stored data is interpreted. For the restored data, some extent references may include references to data that is newer than the designated restore point in time. An extent reference's transaction filter may limit the data that can be presented to the rest of the database. Each scan of persistent data has a snapshot transaction commit number which may interpret which data is visible to the scan. A scan going through an extent reference with a transaction filter may use the lesser of the scan's snapshot transaction commit number or the extent reference's transaction filter as the transaction visibility criteria when qualifying rows. This allows a point in time view of the data, without reconstructing data artifacts as they were as of a point in time by replaying a database transaction log (e.g., log 300 shown in FIG. 4I). A virtual point in time restore using extent references with transaction commit numbers may be constructed quickly compared to scanning a time ordered log and applying records up to a desired point in time.

In implementations of the disclosed subject matter, the database system (e.g., system 30, database systems 1200a-d, or the like) may save extents (e.g., extents 1251 and/or data extent 1270 shown in FIG. 6C) and information about extents (e.g., metadata, and/or the extent reference 1252, shown in FIG. 6C) based on a predefined retention window. For example, the predefined retention window may be 30 days, 60 days, 90 days, 120 days, or the like. As discussed above, a full copy of the data in the LSM tree may be made at a particular point in time (e.g., every day at the same time, twice a day, every hour, or the like). For a restore operation, the full copy may be located before the target point in time, and a particular tenant's data from the full copy may be located (e.g., the initial archival set).

Archiving the data may include saving the metadata (e.g., extents 1251, extent references 1252, and the like), as well as the underlying referenced extents (e.g., data extents 1270) in a separate storage location. The separate storage location may include an archival storage system for the extents, and an archival metadata storage database.

The archival system may capture changes that are coming into the target database (e.g., database system 1200a-1200d) in the form of data extents. In implementations of the disclosed subject matter, the changes may be captured by the extents that are flushed into persistence (i.e., the level 0 extents that are part of a flush operation that are stored, e.g., in storage 1260). In another implementation of the disclosed subject matter, extents may be captured as they flow to the lowest level of the LSM. This may occur when the LSM is not removing superseded records from the LSM as it is generating new extents as part of flushing from memory to level 0, or as part of merging.

In implementations of the disclosed subject matter, a request to restore a tenant's data to a point in time T may be received by the database system. The system (e.g., system 30, system 50, database system 1200a-1200d) may locate the most recent snapshot S of the database before the time T. The database system may identify all extents in the located snapshot which may contain data for the tenant. These extents may be added by the database system to a restore extent reference set.

The database system may locate all the extents that were created after snapshot S but before snapshot S+1. From the located set of extents, the database system may find the extents that may have data up to and including time T for the tenant. From these extents, the database system may set the minimum key and the maximum key, and set a transaction filter based on time T if the extent spans time.

By performing the point-in-time restore operations of these implementations, embodiments disclosed herein may minimize the replay from a log file (e.g., log 300) or may minimize performing similar resource-intensive operations, compared to traditional database restore operations. That is, the systems and methods disclosed throughout may provide more efficient operation of the computer systems (e.g., system 50 shown in FIGS. 4A-4E and 4G-4I) on which tenant data is stored. These disclosed implementations may reduce the computing resources necessary to perform a point-in-time restore.

Figure 5:
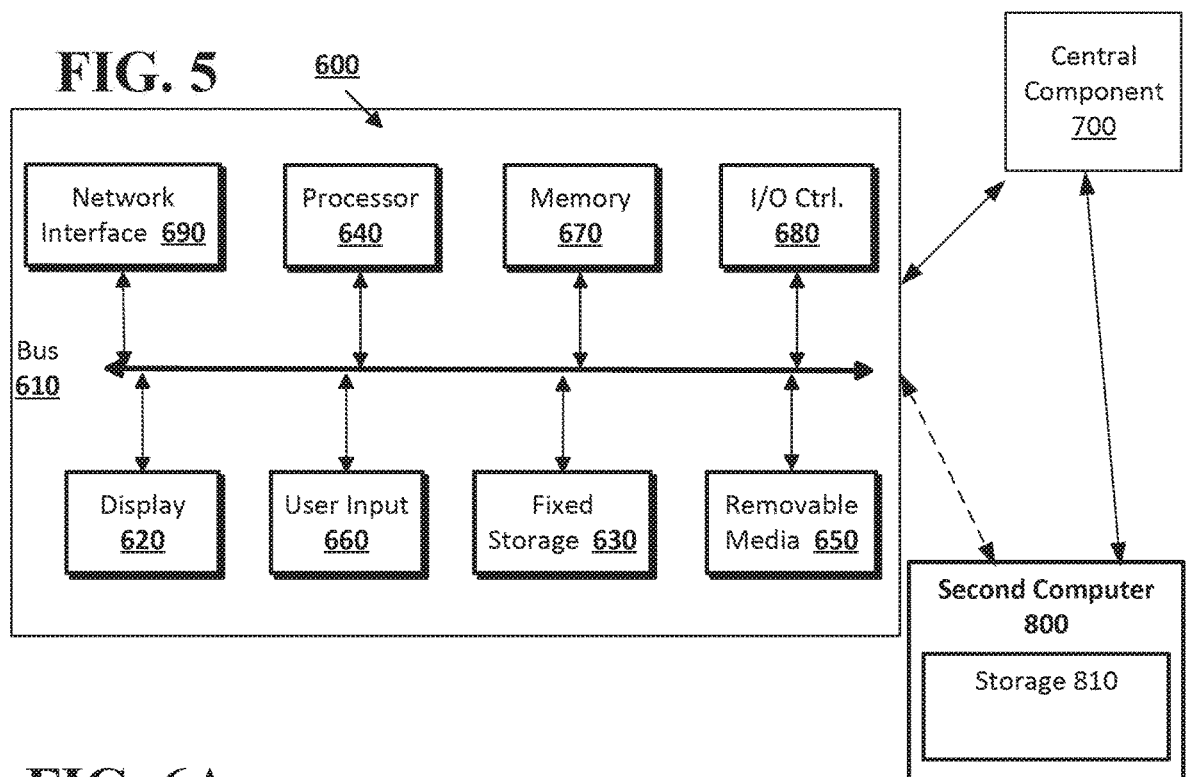
FIG. 5 shows a computer according to an implementation of the disclosed subject matter.

Implementations of the presently disclosed subject matter may be implemented in and used with a variety of component and network architectures. FIG. 5 is an example computer 600 suitable for implementing implementations of the presently disclosed subject matter. As discussed in further detail herein, the computer 600 may be a single computer in a network of multiple computers. As shown in FIG. 5, the computer 600 may communicate with a central or distributed component 700 (e.g., server, cloud server, database, cluster, application server, etc.). The central component 700 may communicate with one or more other computers such as the second computer 800, which may include a storage device 810. The second computer 800 may be a server, cloud server, or the like. The storage 810 may use any suitable combination of any suitable volatile and non-volatile physical storage mediums, including, for example, hard disk drives, solid state drives, optical media, flash memory, tape drives, registers, and random access memory, or the like, or any combination thereof.

Data may be stored in any suitable format in, for example, the storage 810, using any suitable filesystem or storage scheme or hierarchy. For example, the storage 810 may store data using a log structured merge (LSM) tree with multiple levels. Further, if the systems shown in FIGS. 4-5 are multitenant systems, the storage may be organized into separate log structured merge trees for each instance of a database for a tenant. That is, there may be separate databases (e.g., LSM trees) for each tenant. Alternatively, contents of all records on a particular server or system may be stored within a single log structured merge tree, in which case unique tenant identifiers associated with versions of records may be used to distinguish between data for each tenant as disclosed herein. More recent transactions may be stored at the highest or top level of the tree and older transactions may be stored at lower levels of the tree.

The information obtained to and/or from a central component 700 may be isolated for each computer such that computer 600 may not share information with computer 800. Alternatively, or in addition, computer 600 may communicate directly with the second computer 800.

The computer (e.g., user computer, enterprise computer, etc.) 600 includes a bus 610 which interconnects major components of the computer 600, such as a central processor 640, a memory 670 (typically RAM, but which may also include ROM, flash RAM, or the like), an input/output controller 680, a user display 620, such as a display or touch screen via a display adapter, a user input interface 660, which may include one or more controllers and associated user input or devices such as a keyboard, mouse, Wi-Fi/cellular radios, touchscreen, microphone/speakers and the like, and may be closely coupled to the I/O controller 680, fixed storage 630, such as a hard drive, flash storage, Fibre Channel network, SAN device, SCSI device, and the like, and a removable media component 650 operative to control and receive an optical disk, flash drive, and the like.

The bus 610 enable data communication between the central processor 640 and the memory 670, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 600 can be stored on and accessed via a computer readable medium, such as a hard disk drive (e.g., fixed storage 630), an optical drive, floppy disk, or other storage medium 650.

The fixed storage 630 may be integral with the computer 600 or may be separate and accessed through other interfaces. The fixed storage 630 may be part of a storage area network (SAN). A network interface 690 may provide a direct connection to a remote server via a telephone link, to the Internet via an internet service provider (ISP), or a direct connection to a remote server via a direct network link to the Internet via a POP (point of presence) or other technique. The network interface 690 may provide such connection using wireless techniques, including digital cellular telephone connection, Cellular Digital Packet Data (CDPD) connection, digital satellite data connection or the like. For example, the network interface 690 may enable the computer to communicate with other computers and/or storage devices via one or more local, wide-area, or other networks, as shown in FIG. 5.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 5 need not be present to practice the present disclosure. The components can be interconnected in different ways from that shown. Code to implement the present disclosure can be stored in computer-readable storage media such as one or more of the memory 670, fixed storage 630, removable media 650, or on a remote storage location.

Figure 6A:
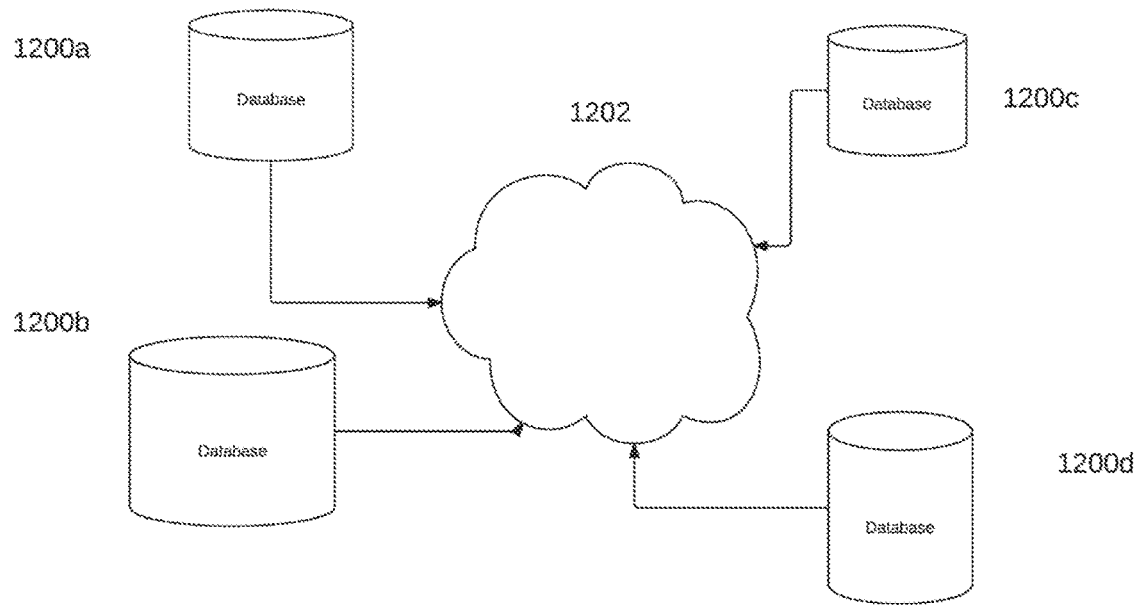
Figure 6B:
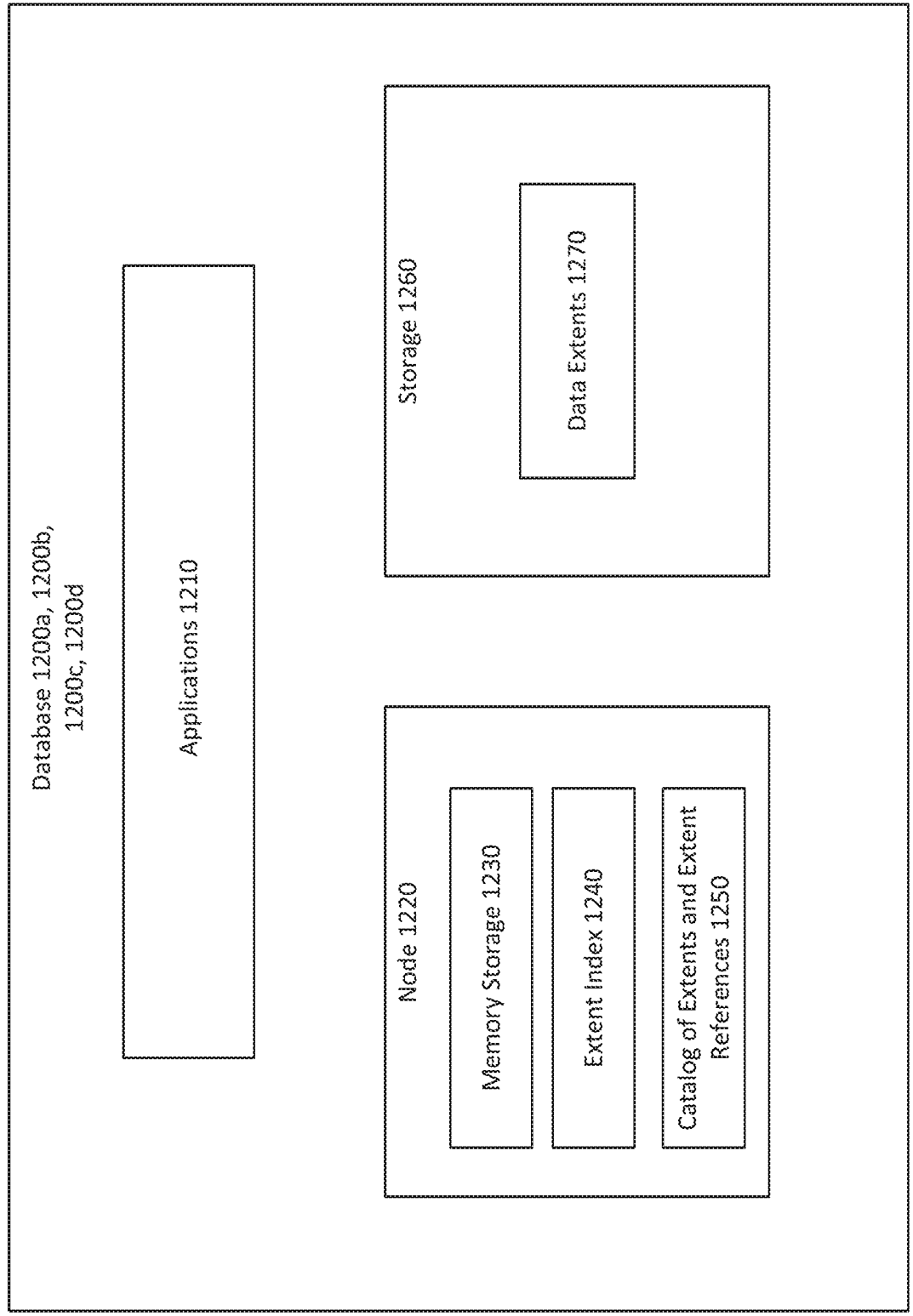

FIGS. 6A-6C show an example network arrangement according to an implementation of the disclosed subject matter. Four separate database systems 1200a-d at different nodes in the network represented by cloud 1202 communicate with each other through networking links 1204 and with users (not shown). Each of database systems 1200 may be operable to host multiple instances of a database, where each instance is accessible only to a particular tenant (e.g., users associated with a particular tenant who are authorized to access the data of the tenant). Each of the database systems may constitute a cluster of computers along with a storage area network (not shown), load balancers and backup servers along with firewalls, other security systems, and authentication systems. Some of the instances at any of systems 1200 may be live or production instances processing and committing transactions received from users or from computing elements (not shown) for ingesting and providing data for storage in the instances.

One or more of the database systems 1200a-1200d may create a sandbox for an original tenant at any time. For example, the database systems may receive a request to have a point-in-time restore appear as a different dataset without supplanting the existing tenant data, then the extent reference set can be mapped to a new sandbox tenant identity. The system, for example 1200c, may include at least one storage device, such as in FIG. 5. For example, the storage may include memory 670, fixed storage 630, removable media 650, a storage device included with the central component 700 and/or the second computer 800, and/or one or more storage devices associated with one or more of the database systems 1200a-1200d. In another example, the database systems 1200a-1200c may have storage 1260, as shown in FIGS. 6B-6C. The storage 1260 may include one or more storage devices that provide persistent storage of data (e.g., tenant data).

FIGS. 6B-6C show an individual database system 1200a, 1200b, 1200c, or 1200d according to an implementation of the disclosed subject matter. The database system 1200a, 1200b, 1200c, or 1200d may include one or more applications 1210 (shown in FIG. 6B), which may use data and/or information from the node 1220 and/or the storage 1260, which may be one or more storage devices. Applications 1210 may include customer relationship management (CRM) applications or the like. The node 1220, which may include one or more servers and/or virtual servers, may include memory storage 1230, extent index 1240 and a catalog of extents and extent references 1250. Memory storage 1230 may store the most recent transactions processed by the database system 1200a, 1200b, 1200c, or 1200d. These most recent transactions may be committed to the storage 1260, for example, at predetermined periods of time. The extent index 1240 and the catalog of extents and extent references 1250 are discussed below in connection with FIG. 6C. Storage 1260 may be one or more storage devices, and may store data extents 1270 which may include tenant data.

FIG. 6C shows a node and storage for an individual database system 1200a, 1200b, 1200c, or 1200d according to an implementation of the disclosed subject matter. Node 1220 may include memory storage 1230 and extent index 1240, which as discussed above in connection with FIG. 6B. Node 1120 may include the catalog 1250, which may include extents 1251 and extent references 1251. Extents 1251 may refer to a region of storage, and may include extent identifiers (Eid). Extent references 1252 may include the extent identifiers (Eid), key start values and key end values, and the level in the LSM structure for the extent reference.

Tenant data may be stored in an immutable storage (e.g., storage 1260 of FIG. 6B-6C) of the at least one storage device associated with an original tenant identifier. The original tenant data may be used to create a snapshot for a point-in-time restore operation. The one or more servers of the systems shown in FIGS. 5-6C may receive a request to restore tenant data to a particular point in time. The key range included in the restore request may include the transaction point from which to restore the data at a point in time (e.g., based on the key range), or may reference a time stamp or sequence indicator. The one or more servers of the systems shown in FIGS. 5-6C may receive the data from the immutable storage for the sandbox tenant from the at least one storage device (e.g., the storage device associated with central component 700, the second computer 800, and/or the storage 1260 of the database systems 1200a-1200d) based on the dynamic mapping of the key indicating the data for the point-in-time restore of a tenant. Any changes to the data from the snapshot point-in-time to the desired point-in-time restore may be achieved by replaying the changes from, for example, the transaction log (e.g., log 300 shown in FIG. 4F). Alternatively, a transaction filter may be applied to filter transaction data for the desired point in time for a restoration of the tenant data. The data resulting from the performed restore operation may be in the immutable storage, such as the storage device associated with central component 700, second computer 800, and/or the storage 1260 of one or more of the database systems 1200a-1200d.

The one or more servers of the systems shown in FIGS. 5-6C may receive a request for a restore operation (e.g., from computer 600 shown in FIG. 5, or the like) for at least a portion of tenant data, and may operate on data from the immutable storage of the at least one storage device to perform the point-in-time restore operation for the tenant data. The one or more servers receives the data from the immutable storage (e.g., storage 1260 shown in FIGS. 6B-6C) from the at least one storage device for the tenant, and may perform the point-in-time restore using a snapshot of the tenant data that is closest to the desired point in time, and may replay the changes to the data from the log or by using a filter (e.g., a transaction filter) to reach the data at the desired point in time.

In some implementations, the one or more servers shown in FIGS. 5-6C may perform a point-in-time restore of data of a tenant of a multitenanted database system. At least one storage device (e.g., a storage device associated with central component 700, the second computer 800, and/or the storage 1260 of the database systems 1200a-1200d) may store tenant data. The tenant data may be associated with a metadata tenant identifier and metadata that is indicative of when records are created and deleted from the database system, and is indicative of different versions of tenant data that are committed to the database system from time-to-time. At least one server (e.g., computer 600, central component 700, second computer 800, and/or the storage 1260 of the database systems 1200a-1200d) may locate metadata to identify archival information (e.g., an initial archival set, and may include one or more incremental archival sets that may be used to restore the data to the desired point in time) of the data of a tenant stored in the storage device. The archival data may include a most recently committed version of each datum prior to a desired point in time for a restore operation. The at least one server may map, by using the metadata, a restore reference set into a target database instance of the database system, when all existing data for a tenant is to be replaced with the archival version, and where versions of data and records committed after the point in time are not available to the database instance.

The at least one server, such as shown in FIGS. 5-6C, may map the restore reference set into the target database instance to restore tenant data to be transactionally consistent as of the first point in time. The restoration of the tenant data to a particular point in time does not affect the other tenants that are hosted in the target database instance of the database system.

The extent references may virtualize access to the at least one storage device (e.g., a storage device associated with central component 700, the second computer 800, and/or the storage 1260 the database systems 1200a-1200d), and at least a portion of the extent references are grouped into the extent reference set that points to a persistence associated with a database instance of the database system. An example of this virtualization is shown in FIG. 3 and described above. Each extent reference (e.g., which may be part of extent reference 1252) of the extent reference set may include a minimum key and a maximum key to set a boundary range for the tenant data that is to be restored. The at least one server shown in FIGS. 5-6C may locate the extent references that were generated after the archival version of the data that contains tenant data before the first point in time, and adds each of the located extent references to the restore reference set, which has the same minimum key and the same maximum key mapping. The at least one server may access the restored data, and when at least some of the extent references contain references to data in the immutable storage that is newer than the first point in time, the server may filter the data to be presented.

In some implementations, the at least one server (e.g., computer 600, central component 700, second computer 800, and/or the node 1220 of the database systems 1200a-1200d) may restore the tenant prior to a first point in time, and updates the restored tenant data with data committed at or before the first point in time.

In some implementations, the one or more servers shown in FIGS. 5-6C may perform a point-in-time restore of data of a first tenant of a multitenanted database system using a single database to support multiple tenant instances. At least one storage device (e.g., a storage device associated with central component 700, the second computer 800, and/or the storage 1260 of the database systems 1200a-1200d) may store tenant data. At least one server (e.g., computer 600, central component 700, second computer 800, and/or the node 1220 the database systems 1200a-1200d) may commit or delete versions of records from the single database, may create records from time-to-time, may switch pointers in the database system to an archival version of the data of the first tenant in the at least one storage device, and may limit access of the database to the data of the first tenant that was committed before a point in time while the database is able to process data of other tenants.

The systems and methods of the disclosed subject matter may be for single tenancy and/or multitenancy systems. Multitenancy systems may allow various tenants, which may be, for example, users, groups of users, or organizations, to access their own records on the server system through software tools or instances on the server system that may be shared among the various tenants. The contents of records for each tenant may be part of a database containing that tenant. Contents of records for multiple tenants may all be stored together within the same database, but each tenant may only be able to access contents of records which belong to, or were created by, that tenant. This may allow a database system to enable multitenancy without having to store each tenants' contents of records separately, for example, on separate servers or server systems. The database for a tenant may be, for example, a relational database, hierarchical database, or any other suitable database type. All records stored on the server system may be stored in any suitable structure, including, for example, a LSM tree.

A multitenant system may have various tenant instances on server systems distributed throughout a network with a computing system at each node. The live or production database instance of each tenant may only have its transactions processed at one computer system. The computing system for processing the transactions of that instance may also process transactions of other instances for other tenants.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
    performing a point-in-time restore of data of a first tenant of a multitenanted database system having immutable storage by:
        locating metadata to identify an archival version of first data of a first tenant stored in the immutable storage, wherein the archival version includes a most recently committed version of each datum prior to a first point in time; and
        mapping, by using the metadata, a restore reference set into a target database instance of the database system, wherein the restore reference set includes a minimum key and a maximum key to set a boundary range for the tenant data that is to be restored to the first point in time, and wherein versions of data and records committed after the point in time are not available to the target database instance.

2. The method of claim 1, wherein the mapping the restore reference set into the target database instance comprises restoring tenant data to be transactionally consistent as of the first point in time.

3. The method of claim 2, wherein the restoring the tenant data does not affect other tenants that are hosted in the target database instance of the database system.

4. The method of claim 1, further comprising:
    locating extent references that were generated after the archival version of the first data that contain tenant data before the first point in time; and
    adding each of the located extent references to the restore reference set, which has the same minimum key and the same maximum key mapping.

5. The method of claim 1, further comprising:
accessing the restored tenant data; and
when at least some extent references of the restored tenant data include references to data in the immutable storage that is newer than the first point in time, filtering the data to be presented.

6. The method of claim 1, further comprising:
restoring the tenant prior to a first point in time; and
updating the restored tenant data with data committed at or before the first point in time.

7. A method comprising:
performing a point-in-time restore in a first tenant of a multitenanted database system having immutable storage by:
- locating archival data of a first tenant prior to a desired point in time based on archival metadata information, wherein the archival data is previously written and not the current data of the first tenant;
- switching pointers in the database system from the current data of the first tenant to the located archival version of the data of the first tenant in the immutable storage; and
- limiting access of the database to the data of the first tenant that was committed before the point in time while the database is able to process data of other tenants.

* * * * *